US006963670B2

(12) United States Patent
Avinash et al.

(10) Patent No.: US 6,963,670 B2
(45) Date of Patent: Nov. 8, 2005

(54) CT DOSE REDUCTION FILTER WITH A COMPUTATIONALLY EFFICIENT IMPLEMENTATION

(75) Inventors: Gopal B. Avinash, New Berlin, WI (US); Thomas Toth, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 668 days.

(21) Appl. No.: 09/990,030

(22) Filed: Nov. 21, 2001

(65) Prior Publication Data

US 2003/0099405 A1 May 29, 2003

(51) Int. Cl.[7] .................................................. G06K 9/40

(52) U.S. Cl. ....................... 382/260; 382/274; 382/275; 358/3.26; 358/463

(58) Field of Search ................................ 382/252, 259, 382/260, 274, 275, 258, 282, 284, 294, 298, 299; 358/3.26, 3.27, 451, 463, 1.2, 520, 519, 450

(56) References Cited

U.S. PATENT DOCUMENTS 5,860,931 A * 1/1999 Chandler .................... 600/458
6,018,597 A * 1/2000 Maltsev et al. ............. 382/260
6,173,083 B1 1/2001 Avinash ...................... 382/260
6,208,763 B1 3/2001 Avinash ...................... 382/254
6,424,730 B1 * 7/2002 Wang et al. ................ 382/128
6,633,662 B2 * 10/2003 Ravkin ....................... 382/133
6,717,610 B1 * 4/2004 Bos et al. ................... 348/148
6,720,997 B1 * 4/2004 Horie et al. ............. 348/218.1

* cited by examiner

*Primary Examiner*—Bhavesh M. Mehta
*Assistant Examiner*—Yosef Kassa
(74) *Attorney, Agent, or Firm*—Fletcher Yoder

(57) ABSTRACT

A technique for reducing noise in pixel images includes modifying initial image data to prevent subsequent image data loss, shrinking the modified image, processing the shrunken image with known segmentation-based filtering techniques which identify and differentially processing structures within the image. After processing, the shrunken image is enlarged to the dimensions of the initial data and subsequently processed to correct intensity irregularities and to preserve CT numbers. The resulting technique is versatile and provides greatly improved computational efficiency while maintaining image quality, allowing for dose reduction during imaging.

94 Claims, 14 Drawing Sheets

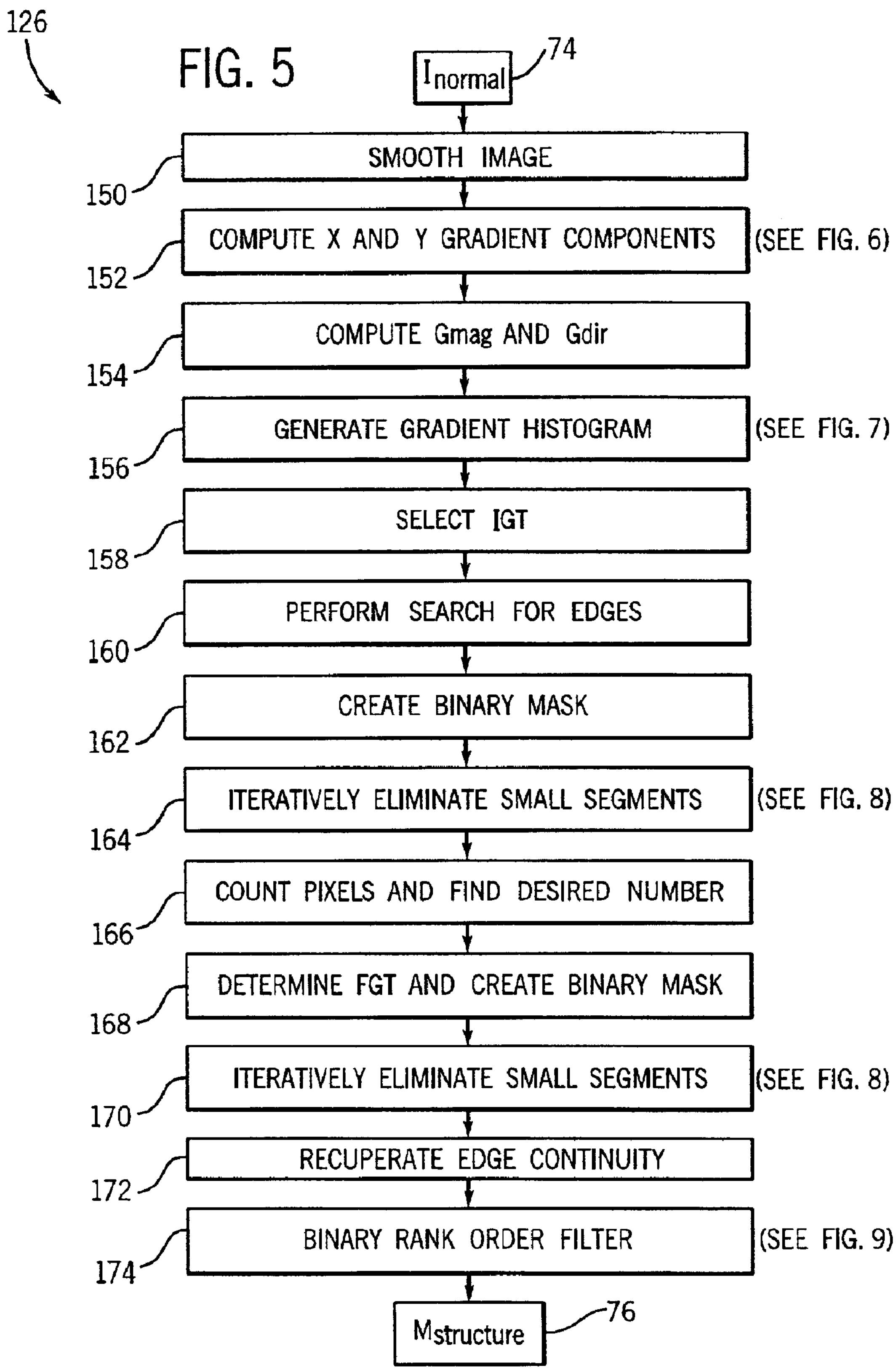
126
FIG. 5
Inormal
74
SMOOTH IMAGE
150
COMPUTE X AND Y GRADIENT COMPONENTS
(SEE FIG. 6)
152
COMPUTE Gmag AND Gdir
154
GENERATE GRADIENT HISTOGRAM
(SEE FIG. 7)
156
SELECT IGT
158
PERFORM SEARCH FOR EDGES
160
CREATE BINARY MASK
162
ITERATIVELY ELIMINATE SMALL SEGMENTS
(SEE FIG. 8)
164
COUNT PIXELS AND FIND DESIRED NUMBER
166
DETERMINE FGT AND CREATE BINARY MASK
168
ITERATIVELY ELIMINATE SMALL SEGMENTS
(SEE FIG. 8)
170
RECUPERATE EDGE CONTINUITY
172
BINARY RANK ORDER FILTER
(SEE FIG. 9)
174
Mstructure
76

CT DOSE REDUCTION FILTER WITH A COMPUTATIONALLY EFFICIENT IMPLEMENTATION

FIELD OF THE INVENTION

This invention relates to discrete picture element or pixel imaging techniques, and, more particularly, to an improved technique for use with computed tomography. The invention relates to analyzing and modifying values representative of pixels which significantly increases computational efficiency while maintaining overall image quality.

BACKGROUND OF THE INVENTION

A variety of discrete pixel imaging techniques are known and are presently in use. In general, such techniques rely on the collection or acquisition of data representative of each discrete pixel composing an image matrix. Particular examples abound in the medical imaging field where modalities such as computed tomography (CT) are available for producing the data represented by the pixels. Depending upon the particular modality employed, the pixel data is detected and encoded, such as in the form of digital values. The values are linked to particular relative locations of the pixels in the reconstructed image.

The utility of a processed image is often largely dependent upon the degree to which it can be interpreted by users or processed by subsequent automation. For example, in the field of medical diagnostics imaging, CT images are most useful when they can be easily understood and compared by an attending physician or radiologist. Typically one impediment to interpretation or further processing is the pixel to pixel variation which is attributable to acquisition noise. While acquisition noise is usually random, there may also be additional structured noise as well which may be observed as artifacts in the image. To mitigate the effects of random noise, many forms of noise reduction filters to improve the final image presentation have been proposed.

Moreover, while a number of image processing parameters may control the final image presentation, it is often difficult to determine which of these parameters, or which combination of the parameters, may be adjusted to provide the optimal image presentation. Often, the image processing techniques must be adjusted in accordance with empirical feedback from an operator, such as a physician or technician.

The facility with which a reconstructed discrete pixel image may be interpreted by an observer may rely upon intuitive factors of which the observer may not be consciously aware. In medical imaging, a physician or radiologist may seek specific structures or specific features in an image such as bone, soft tissue or fluids. Such structures may be physically defined in the image by contiguous edges, contrast, texture, and so forth.

The presentation of such features often depends heavily upon the particular image processing technique employed for converting the detected values representative of each pixel to modified values used in the final image. The image processing technique employed can therefore greatly affect the ability of an observer or an analytical device to recognize salient features of interest. The technique should carefully maintain recognizable structures of interest, as well as abnormal or unusual structures, while providing adequate textural and contrast information for interpretation of these structures and surrounding background. Ideally the technique will perform these functions in a computationally efficient manner so that processing times, as well as hardware requirements, can be minimized.

Known signal processing systems for enhancing discrete pixel images suffer from certain drawbacks. For example, such systems may not consistently provide comparable image presentations in which salient features or structures may be easily visualized. Differences in the reconstructed images may result from particularities of individual scanners and circuitry, as well as from variations in the detected parameters such as received radiation. Differences can also result from the size, composition, position, or orientation of a subject or item being scanned. Signal processing techniques employed in known systems are often difficult to reconfigure or adjust, owing to the relative inflexibility of hardware or firmware devices in which they are implemented or to the coding approach employed in software.

In addition, current techniques may result in highlighting of small, isolated areas which are not important for interpretation and may be distracting to the viewer. Conversely, in techniques enhancing images by feature structure recognition, breaks or discontinuities may be created between separate structural portions, such as along edges. Such techniques may provide some degree of smoothing or edge enhancement, but may not provide satisfactory retention of textures at ends of edges or lines.

Finally, known signal processing techniques often employ inefficient computational noise reduction algorithms, resulting in delays in formulation of the reconstituted image or under-utilization of signal processing capabilities. More computationally efficient algorithms would allow both quicker image display. Further, more computationally efficient noise reduction algorithms are more suitable for diagnostic imaging systems due to both the increased speed and the less stringent equipment requirements.

In addition to the general problems associated with image processing certain specific problems are associated with the processing of images derived from CT systems. First, using current techniques, spatial domain filters are computationally intensive and alter the CT numbers, making the current spatial domain filters unsuited for diagnostic imaging CT scanners. In addition, the nature of the circular CT field produces degraded performance along the periphery which requires different levels of correction.

There is a need, therefore, for a more computationally efficient technique for enhancing discrete pixel images which addresses these concerns. Ideally such a technique would be robust in its implementation and would address not only the general image processing problems but also those specific to CT imaging.

SUMMARY OF THE INVENTION

The invention provides an improved technique for enhancing discrete pixel images in a CT imaging system which is computationally efficient and which maintains image quality. The technique provides a means of combining multi-resolution decomposition (wavelet based processing) with segmentation based techniques which identify structures within an image and separately process the pixels associated with the structures. This combination allows the technique to exploit the redundancies of an image, as with wavelet based techniques, while also allowing the separate processing of structures and non-structures, as in segmentation-based techniques. The combination of these techniques results in a computationally efficient, yet robust, noise reduction filter which may be applied to a variety of pixel based images.

The technique also allows for the introduction of a filter dependent offset which acts to keep CT numbers intact and, further, processes image data using CT masks which allow differential processing of image data within the CT circle. The technique also allows for virtual dose improvements since a subject can be exposed to lower levels of a radiation source while still achieving the same quality of images. Any CT image acquisition system may benefit from the application of the present technique.

In an exemplary embodiment an image is pre-processed to introduce an image offset to ensure that all pixel values are positive. Multi-resolution decomposition is then performed whereby the image is shrunk by a given factor, allowing for the exploitation of redundancies in the image during subsequent processing. The shrunken image is then processed using segmentation based techniques which begin by identifying the structure elements within a blurred or smoothed image. Segmentation processing renders the structural details more robust and less susceptible to noise. A scalable threshold may serve as the basis for the identification of structural regions, making the enhancement framework inherently applicable to a range of image types and data characteristics. While small, isolated regions may be filtered out of the image, certain of these may be recuperated to maintain edge and feature continuity.

Following identification of the structures, portions of the image, including structural and non-structural regions, are smoothed. Structural regions may be smoothed to enhance structural features in dominant orientations, which may be identified to provide consistency both along and across structures. Non-structural regions may be homogenized to provide an understandable background for the salient structures. The structures may be further sharpened, and minute regions may be identified which are considered representative of noise. Such artifacts may be smoothed, removed or selectively sharpened based upon a predetermined threshold value.

Upon completion of the segmentation based processing, the image is expanded by the same factor it was originally shrunk by to return it to its original size. Original texture may be added back to non-structural regions to further facilitate interpretation of both the non-structural and structural features. Following restoration of texture, CT masks are created and the image intensity values within the CT circle are corrected using the CT masks. A post-processing step is then performed to remove the image offset introduced at the beginning of the process. Finally, a filter strength dependent bias value is subtracted from all pixels to correct for small biases in the CT numbers.

The ability of the present technique to increase computational efficiency, due to exploitation of the image redundancies, while maintaining image quality is particularly noteworthy since a reduction in image quality might be expected as a result of the image resizing. Surprisingly, however, no such decrease in image quality is observed.

The technique is useful in processing pixel based images derived by a CT imaging system. Due to the efficiencies introduced by the technique, lower dose images may be acquired without perceived image quality degradation.

BRIEF DESCRIPTION OF THE DRAWINGS

FIG. 5 is a flow chart illustrating steps in exemplary control logic for identifying structural features in a discrete pixel image;

DETAILED DESCRIPTION OF THE INVENTION

Figure 3:
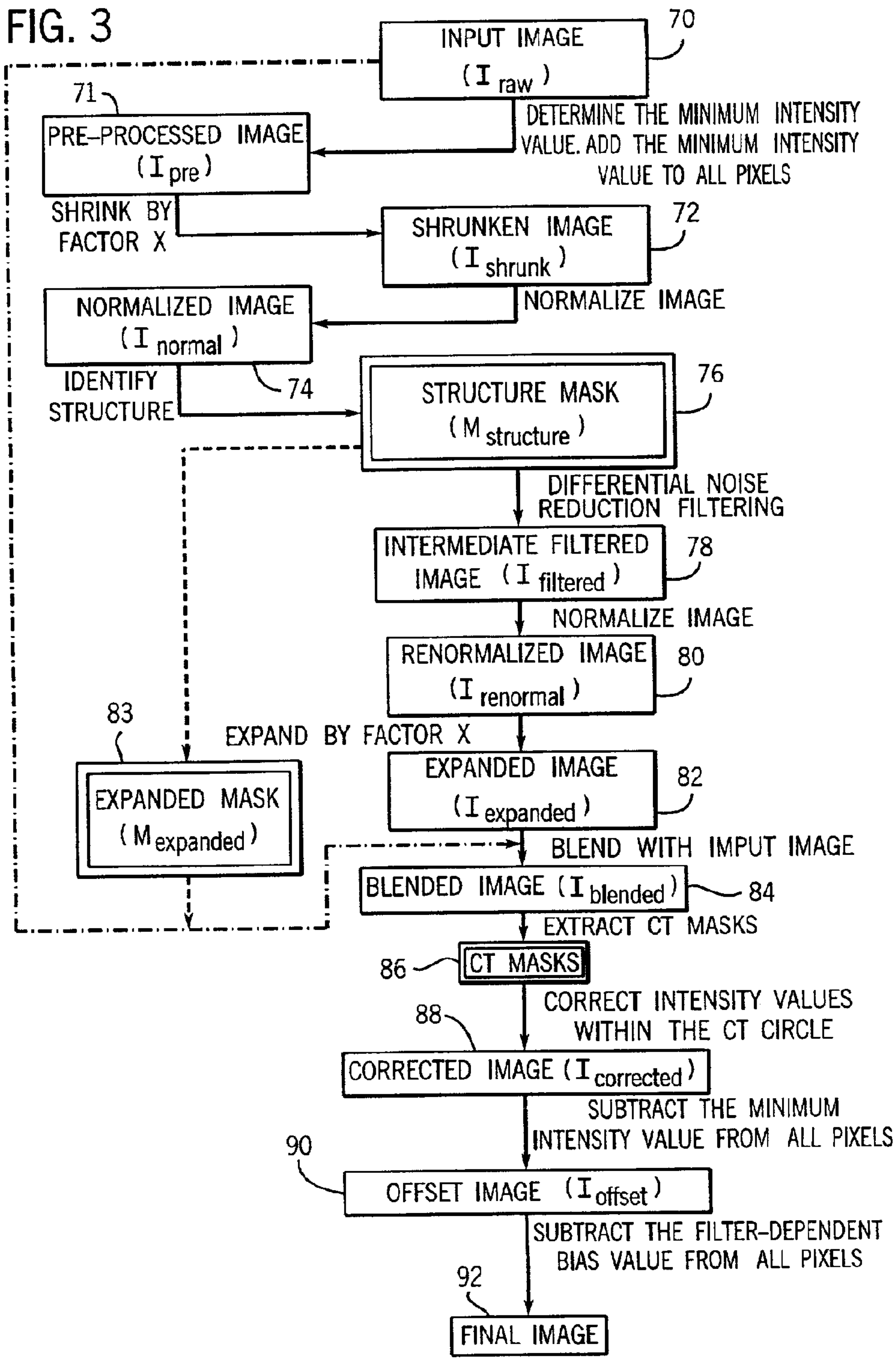
FIG. 3 is a flow chart illustrating the progression of an image through the present technique.

A highly abstracted rendition of image processing by the present technique is illustrated in FIG. 3, beginning with the input of the raw signal data as input image 70. Input image 70 is initially processed to calculate a minimum intensity value. This constant is algebraically added to all the pixel intensity values in the initial image data to make the image intensity positive. The result of this pre-processing step is pre-processed image 71.

Pre-processed image 71 is shrunk by a user configurable parameter, X, to create shrunken image 72. Shrunken image 72 undergoes normalization to create normalized image 74. Threshold criteria are applied to identify structures within normalized image 74. The structures identified are used to generate a structure mask 76 which is used in subsequent processing to distinguish both structure and non-structure regions, allowing differential processing of these regions. Normalized image 74 is filtered to reduce noise via structure mask 76 to create an intermediate filtered image 78 which is subsequently normalized to form renormalized image 80. Renormalized image 80 and structure mask 76 are expanded to form expanded image 82 and expanded structure mask 83. Differential blending of expanded image 82 and input image 70 is accomplished via the application of expanded structure mask 83. The product of the blending process is blended image 84.

Next CT mask 86 is extracted. Based upon application of CT mask 86 corrections are made to blended image 84 resulting in corrected image 88. The minimum intensity value which was added to offset initial image 70 is subtracted from the image data of corrected image 88 to form offset image 90. Finally, a filter strength dependent bias value is subtracted from the image data of offset image 90 to form final image 92. More particular descriptions of this technique follows.

Figure 1:
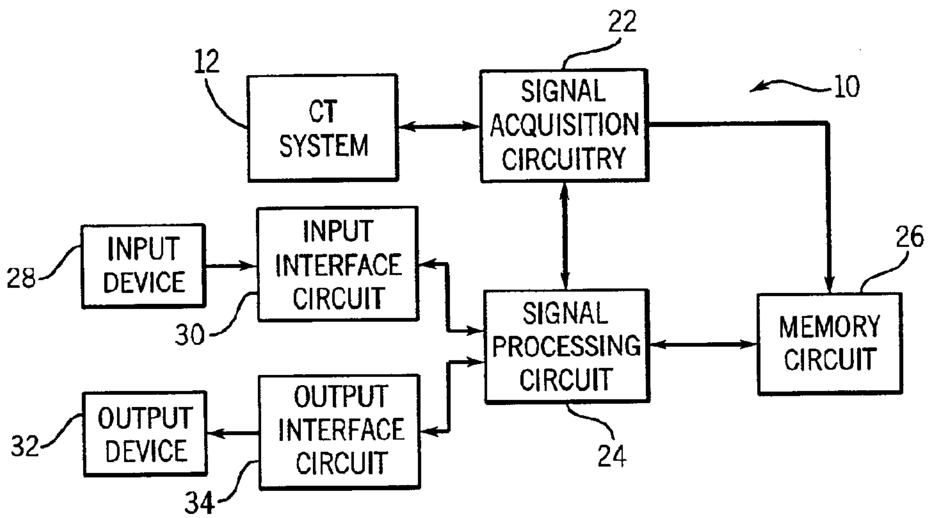
FIG. 1 is a diagrammatical representation of an imaging system adapted to enhance discrete pixel images of a subject.

Referring to FIG. 1, a CT image acquisition system 10 is illustrated as including a CT scanner 12 coupled to circuitry for acquiring and processing discrete pixel data. Signals sensed by scanner 12 are encoded to provide digital values representative of the signals associated with specific locations on or in the subject, and are transmitted to signal acquisition circuitry 22. Signal acquisition circuitry 22 also provides control signals for configuration and coordination of scanner operation during image acquisition. Signal acquisition circuitry 22 transmits the encoded image signals to an signal processing circuit 24. Signal processing circuit 24 executes pre-established control logic routines stored within a memory circuit 26 to filter and condition the signals received from signal acquisition circuitry 22 to provide digital values representative of each pixel in the acquired image. These values are then stored in memory circuit 26 for subsequent processing and display. Alternately, signal acquisition circuitry 22 may transmit the encoded image signals to memory circuit 26. Signal processing circuit 24 may subsequently acquire the signals from memory circuit 26 for the filtering and conditioning steps described above.

Signal processing circuit 24 receives configuration and control commands from an input device 28 via an input interface circuit 30. Input device 28 will typically include an operator's station and keyboard for selectively inputting configuration parameters and for commanding specific image acquisition sequences. Signal processing circuit 24 is also coupled to an output device 32 via an output interface circuit 34. Output device 32 will typically include a monitor or printer for generating reconstituted images based upon the image enhancement processing carried out by circuit 24.

In the embodiment described, signal processing circuit 24, memory circuit 26, and input and output interface circuits 30 and 34 are included in a programmed digital computer. However, circuitry for carrying out the techniques described herein may be configured as appropriate coding in application-specific microprocessors, analog circuitry, or a combination of digital and analog circuitry.

Figure 2:
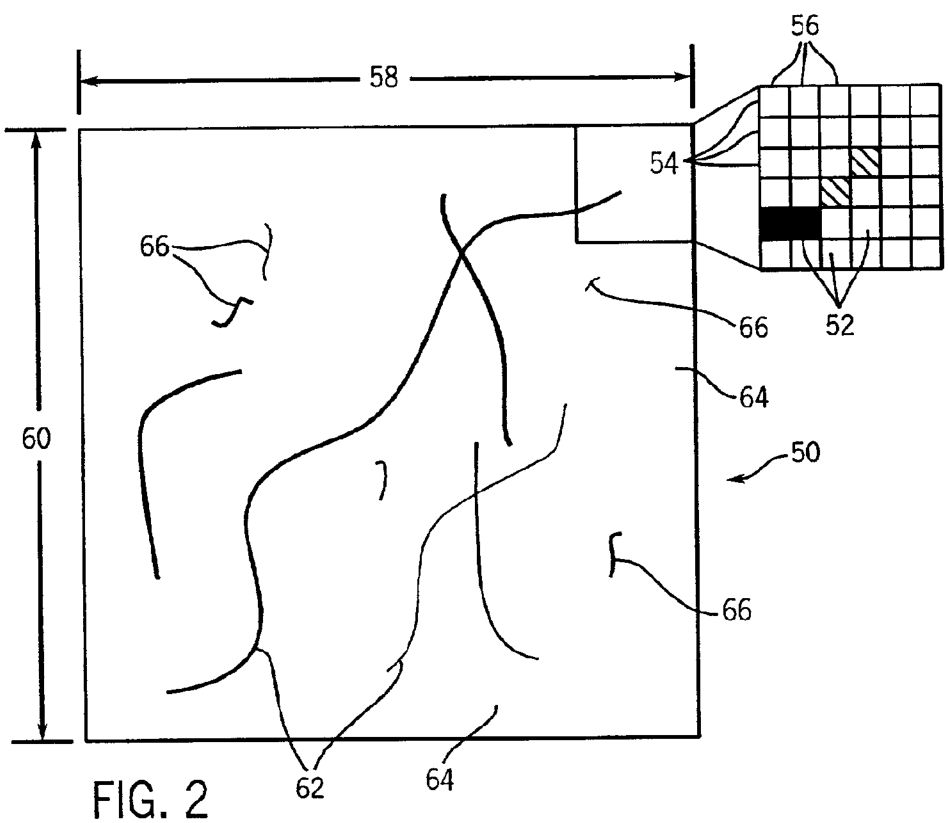
FIG. 2 is a diagram of an exemplary discrete pixel image made up of a matrix of pixels having varying intensities defining structures and non-structures.

FIG. 2 illustrates an exemplary discrete pixel image 50 produced via CT system 10. Image 50 is composed of a matrix of discrete pixels 52 disposed adjacent to one another in a series of rows 54 and columns 56. These rows and columns of pixels provide a pre-established matrix width 58 and matrix height 60. Typical matrix dimensions may include 256×256 pixels; 512×512 pixels; 1,024×1,024 pixels, and so forth. The particular image matrix size may be selected via input device 28 (see FIG. 1) and may vary depending upon such factors as the subject to be imaged and the resolution desired.

Illustrated in FIG. 2, exemplary image 50 includes structural regions 62, illustrated as consisting of long, contiguous lines defined by adjacent pixels. Image 50 also includes non-structural regions 64 lying outside of structural regions 62. Image 50 may also include isolated artifacts 66 of various sizes (i.e., number of adjacent pixels), which may be defined as structural regions, or which may be eliminated from the definition of structure in accordance with the techniques described below. It should be understood that the structures and features of exemplary image 50 are also features of the specific and modified images discussed above in relation to FIG. 3.

Figure 4:
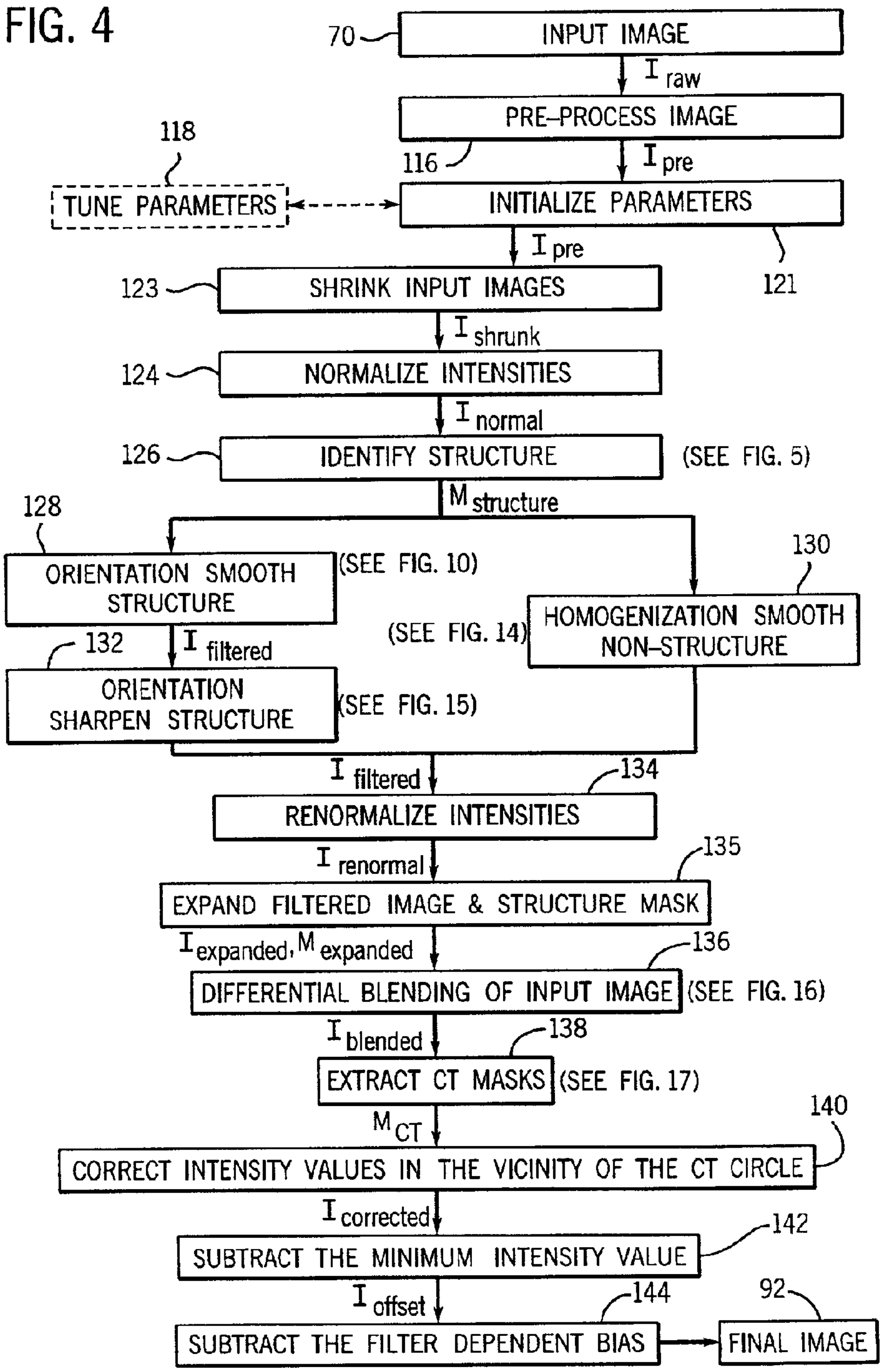
FIG. 4 is a flow chart illustrating steps in exemplary control logic for processing an image by the present technique.

Structural regions 62 and non-structural regions 64 are identified and enhanced in accordance with control logic summarized generally in FIG. 4. This control logic is preferably implemented by signal processing circuit 24 based upon appropriate programming code stored within memory circuit 26. The control logic routine, designated generally by reference numeral 120 in FIG. 4, begins at step 116 with the pre-processing of initial image 70. Pre-processing step 116 involves the calculation of a minimum intensity value for initial image 70. The minimum intensity value is then algebraically added to all of the intensity values of initial image 70 to make the image intensity positive and to obtain pre-processed image 71.

Next, at step 121 the filter parameters employed in the image enhancement process are initialized. The filter parameters are tuned iteratively at step 118 using a testing image database that contains images of various body parts from different patients of various thickness with and without various pathologies. The iterative tuning of filter parameters is illustrated by the dashed line connecting steps 118 and 121. Initialization step 121 may also includes the reading of default and operator-selected values for parameters described in the following discussion, such as the size of small regions to be eliminated from structure, a "focus parameter" and so forth. Where desired, certain of these parameters may be prompted via input device 28, requiring the operator to select between several parameter choices, such as image matrix size.

Next, at step 123, signal processing circuit 24 collects the pre-processed image data 71, represented as $I_{pre}$ and shrinks the image. The shrinking of step 123 may be accomplished by various sub-sampling techniques, including pixel averaging, which read the digital values representative of intensities at each pixel and then shrink the image by some factor X which is generally greater than one. In the preferred embodiment, a 2×2 or 3×3 boxcar filter may be applied to obtain a non-overlapping average. Multi-dimensional factors may also be employed, such as 2×3 or 3×2 filters. A multi-dimensional factor must be greater than one in at least one of the dimensions, such as 3×1 or 1×3. In order to obtain a non-overlapping average, pixels may be mirrored at the boundaries when needed. A shrunken image 72, $I_{shrunk}$, is the product of the sub-sampling technique.

At step 124, signal processing circuit 24 normalizes the image values acquired for the pixels defining the shrunken image 72. In the illustrated embodiment, this step includes reading digital values representative of intensities at each pixel, and scaling these intensities values over a desired dynamic range. For example, the maximum and minimum intensity values in the image may be determined, and used to develop a scaling factor over the full dynamic range of output device 32. Moreover, a data offset value may be added to or subtracted from each pixel value to correct for intensity shifts in the acquired data. Thus, at step 124, circuit 24 processes $I_{shrunk}$ in FIG. 4, to produce normalized image 74, $I_{normal}$. Normalized image 74 includes pixel values filtered to span a desired portion of a dynamic range, such as 12 bits, independent of variations in the acquisition circuitry or subject.

It should be noted that while reference is made in the present discussion to intensity values within an image, such as input image 70, shrunken image 72, normalized image 73, or exemplary image 50, the present technique may also be used to process other parameters encoded for individual pixels 52 of an image. Such parameters might include frequency or color, not merely intensity.

At step 126, signal processing circuit 24 executes a predetermined logic routine for identifying structure 62 within normalized image 74, as defined by data representative of the individual pixels of the image. Exemplary steps for identifying the structure in accordance with the present technique are described below with reference to FIG. 5. The structure identified at step 126 is used to generate a structure mask 76, $M_{structure}$, which is used in subsequent steps. Step 128 uses structure mask 76 to identify structure which is then orientation smoothed as summarized below with reference to FIGS. 10–13. While various techniques may be employed for this orientation smoothing, in the embodiment described, dominant orientation smoothing may be carried out, which tends to bridge gaps between spans of structure, or local orientation smoothing may be employed to avoid such bridging. Orientation smoothing carried out in step 128 thus transforms normalized image 74 to a filtered image 78, $I_{filtered}$, which will be further refined by subsequent processing. After the structure identified at step 126 has been orientation smoothed, the structure regions are then orientation sharpened at step 132 to further refine filtered image 78. The process of orientation sharpening is described more fully below with reference to FIG. 15.

In parallel with the processing of the structure regions described in steps 128 and 132, the non-structure regions of normalized image 74 are further processed as follows to also contribute to filtered image 78. At step 130, signal processing circuit 24 performs homogenization smoothing on non-structure regions of normalized image 74. As described more fully below with reference to FIG. 14, this homogenization smoothing is intended to blend features of non-structural regions into the environment surrounding the structure identified at step 126. At step 134 the filtered image 78 is then renormalized based upon the intensity values after filtering and the original normalized intensity range to produce renormalized image 80.

At step 135, both structure mask 76 and renormalized image 80 are expanded by the same factor by which raw image 70 was originally shrunk in step 123. The products of step 135 are thus an expanded structure mask 83 and expanded image 82, both of which are the same dimensions as input image 70. Finally, at step 136 texture present in input image 70 is blended back into the expanded image 82, $I_{expanded}$, to provide texture for blended image 84. The blending process of step 136 utilizes expanded structure mask 83 to allow differential blending of structure and non-structure regions. The texture blending process is described below with reference to FIG. 16.

FIG. 5 illustrates steps in control logic for identifying structural regions 62 within normalized image 74 and for eliminating small or noisy isolated regions from the definition of the structural regions. As indicated above, the logic of FIG. 5, summarized as step 126 in FIG. 4, begins with pixel data of the normalized image 74.

At step 150 a blurred or smoothed version of normalized image 74 is preferably formed. It has been found that by beginning the steps of FIG. 5 with this smoothed image, structural components of the image may be rendered more robust and less susceptible to noise. While any suitable smoothing technique may be employed at step 150, in the present embodiment, a box-car smoothing technique is used, wherein a box-car filter smoothes the image by averaging the value of each pixel with values of neighboring pixels. As will be appreciated by those skilled in the art, a computationally efficient method for such filtering may be implemented, such as employing a separable kernel (3 or 5 pixels in length) which is moved horizontally and vertically along the image until each pixel has been processed.

Figure 6:
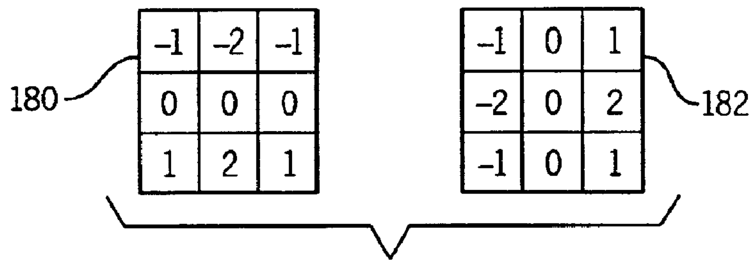
FIG. 6 is a diagram of elements or modules used in the steps of FIG. 4 for generating gradient components for each discrete pixel of the image.

At step 152, X and Y gradient components for each pixel are computed based upon the smoothed version of normalized image 74. While several techniques may be employed for this purpose, in the presently preferred embodiment, 3×3 Sobel modules or operators 180 and 182, illustrated in FIG. 6, are employed. As will be appreciated by those skilled in the art, module 180 is used for identifying the X gradient component, while module 182 is used for identifying the Y gradient component of each pixel. In this process, modules 180 and 182 are superimposed over the individual pixel of interest, with the pixel of interest situated at the central position of the 3×3 module. The intensity values located at the element locations within each module are multiplied by the scalar value contained in the corresponding element, and the resulting values are summed to arrive at the corresponding X and Y gradient components.

With these gradient components thus computed, at step 154 the gradient magnitude, Gmag, and gradient direction, Gdir, are computed. In the presently preferred technique, the gradient magnitude for each pixel is equal to the higher of the absolute values of the X and Y gradient components for the respective pixel. The gradient direction is determined by finding the Arctangent of the Y component divided by the X component. For pixels having an X component equal to zero, the gradient direction is assigned a value of $\pi/2$. The values of the gradient magnitudes and gradient directions for each pixel are saved in memory circuit 26.

It should be noted that alternative techniques may be employed for identifying the X and Y gradient components and for computing the gradient magnitudes and directions. For example, those skilled in the art will recognize that in place of the Sobel gradient modules 180 and 182, other modules such as the Roberts or Prewitt operators may be employed. Moreover, the gradient magnitude may be assigned in other manners, such as a value equal to the sum of the absolute values of the X and Y gradient components.

Figure 7:
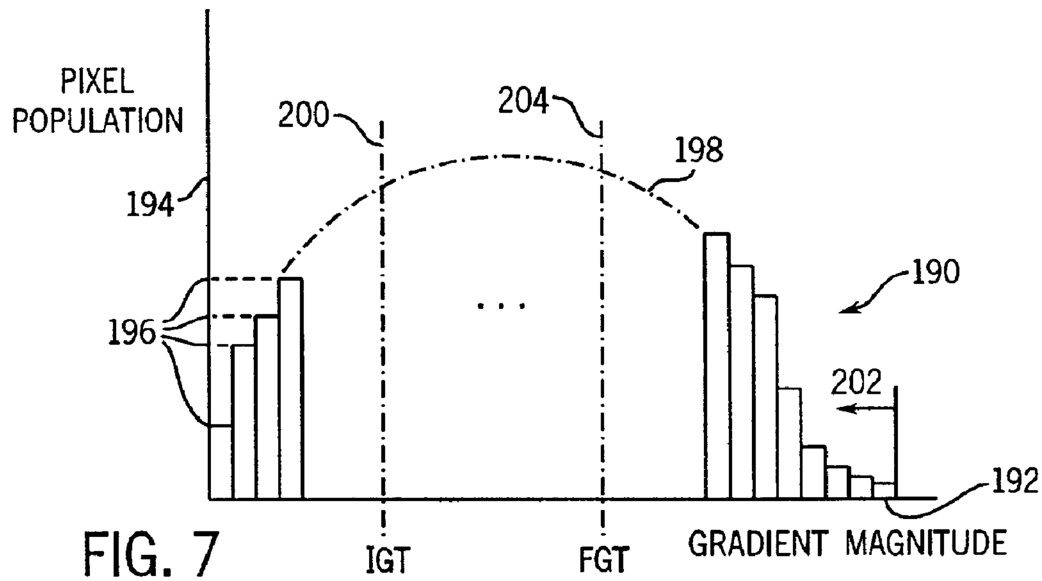
FIG. 7 is a gradient histogram of an image used to identify gradient thresholds for dividing structure from non-structure in the image.

Based upon the gradient magnitude values determined at step 154, a gradient histogram is generated as indicated at step 156. FIG. 7 illustrates an exemplary gradient histogram of this type. The histogram, designated by reference numeral 190, is a bar plot of specific populations of pixels having specific gradient values. These gradient values are indicated by positions along a horizontal axis 192, while counts of the pixel populations for each value are indicated along a vertical axis 194, with each count falling at a discrete level 196. The resulting bar graph forms a step-wise gradient distribution curve 198. Those skilled in the art will appreciate that in the actual implementation the histogram of FIG. 7 need not be represented graphically, but may be functionally determined by the image processing circuitry operating in cooperation with values stored in memory circuitry.

Histogram 190 is used to identify a gradient threshold value for separating structural components of the image from non-structural components. The threshold value is set at a desired gradient magnitude level. Pixels having gradient magnitudes at or above the threshold value are considered to meet a first criterion for defining structure in the image, while pixels having gradient magnitudes lower than the threshold value are initially considered non-structure. The threshold value used to separate structure from non-structure is preferably set by an automatic processing or "autofocus" routine as defined below. However, it should be noted that the threshold value may also be set by operator intervention (e.g. via input device 28) or the automatic value identified through the process described below may be overridden by the operator to provide specific information in the resulting image.

As summarized in FIG. 5, the process for identification of the threshold value begins at step 158 by selecting an initial gradient threshold. This initial gradient threshold, designated 200 in FIG. 7 is conveniently set to a value corresponding to a percentile of the global pixel population, such as 30 percent. The location along axis 192 of the IGT value 200 is thus determined by adding pixel population counts from the left-hand edge of histogram 190 of FIG. 7, adjacent to axis 194 and moving toward the right (i.e., ascending in gradient values). Once the desired percentile value is reached, the corresponding gradient magnitude is the value assigned to the IGT.

At step 160, a search is performed for edges of the desired structure. The edge search proceeds by locating the pixels having gradient magnitudes greater than the IGT value selected in step 158 and considering a 5×5 pixel neighborhood surrounding the relevant pixels of interest. Within the 5×5 pixel neighborhood of each pixel of interest, pixels having gradient magnitudes above the IGT and having directions which do not differ from the direction of the pixel of interest by more than a predetermined angle are counted. In the presently preferred embodiment, an angle of 0.35 radians is used in this comparison step. If the 5×5 neighborhood count is greater than a preset number, 3 in the present embodiment, the pixel of interest is identified as a relevant edge pixel. At step 162, a binary mask image is created wherein pixels identified as relevant edge pixels in step 160 are assigned a value of 1, while all other pixels are assigned a value equal to zero.

Figure 8:
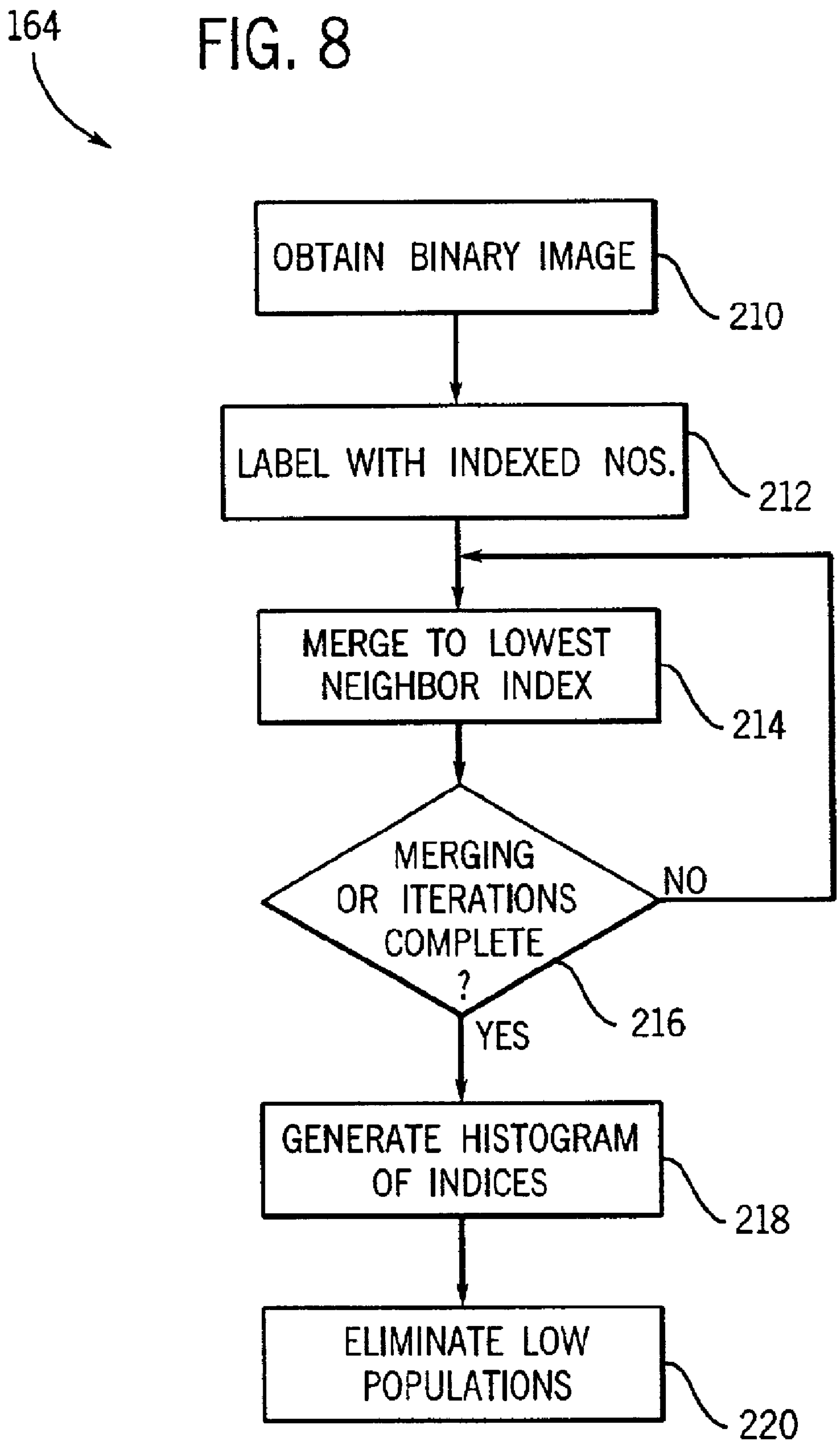
FIG. 8 is a flow chart of steps in exemplary control logic for selectively eliminating small or noisy regions from the structure definition.

At step 164 small or noisy segments identified as potential candidates for structure are iteratively eliminated. Steps in control logic for eliminating these segments are summarized in FIG. 8. Referring to FIG. 8, the process begins at step 210 where a binary image is obtained by assigning a value of 1 to pixels having a gradient magnitude value equal to or greater than a desired value, and a value of zero to all other pixels. This binary image or mask is substantially identical to that produced at step 162 (see FIG. 5). At step 212 each pixel having a value of 1 in the binary mask is assigned an index number beginning with the upper-left hand corner of the image and proceeding to the lower right. The index numbers are incremented for each pixel having a value of 1 in the mask. At step 214 the mask is analyzed row-by-row beginning in the upper left by comparing the index values of pixels within small neighborhoods. For example, when a pixel is identified having an index number, a four-connected comparison is carried out, wherein the index number of the pixel of interest is compared to index numbers, if any, for pixels immediately above, below, to the left, and to the right of the pixel of interest. The index numbers for each of the connected pixels are then changed to the lowest index number in the connected neighborhood. The search, comparison and reassignment then continues through the entire pixel matrix, resulting in regions of neighboring pixels being assigned common index numbers. In the preferred embodiment the index number merging step of 214 may be executed several times, as indicated by step 216 in FIG. 8. Each subsequent iteration is preferably performed in an opposite direction (i.e., from top-to-bottom, and from bottom-to-top).

Following the iterations accomplished through subsequent search and merger of index numbers, the index number pixel matrix will contain contiguous regions of pixels having common index numbers. As indicated at step 218 in FIG. 8, a histogram is then generated from this index matrix by counting the number of pixels having each index number appearing in the index matrix. As will be apparent to those skilled in the art, each separate contiguous region of pixels having index numbers will have a unique index number. At step 220, regions represented by index numbers having populations lower than a desired threshold are eliminated from the definition of structure as determined at step 162 of FIG. 5. In a presently preferred embodiment, regions having a pixel count lower than 50 pixels are eliminated in step 220. The number of pixels to be eliminated in this step, however, may be selected as a function of the matrix size, and the amount and size of isolated artifacts to be permitted in the definition of structure in the final image.

Returning to FIG. 5, with pixels for small segments eliminated from the binary mask created at step 162, the number of pixels remaining in the binary mask are counted as indicated at step 166. While the resulting number may be used to determine a final gradient threshold, it has been found that a convenient method for determining a final gradient threshold for the definition of structure includes the addition of a desired number of pixels to the resulting pixel count. For example, in a presently preferred embodiment a value of 4,000 is added to the binary mask count resulting from step 164 to arrive at a desired number of pixels in the image structure definition. This parameter may be set as a default value, or may be modified by an operator. In general, a higher additive value produces a sharper image, while a lower additive value produces a smoother image. This parameter, referred to in the present embodiment as the "focus parameter" may thus be varied to redefine the classification of pixels into structures and non-structures.

With the desired number of structure pixels thus identified, a final gradient threshold or FGT is determined as illustrated at step 168 in FIG. 5, based upon the histogram 190 as shown in FIG. 7. In particular, the population counts for each gradient magnitude value beginning from the right-hand edge of histogram 190 are summed moving to the left as indicated by reference number 202. Once the desired number of structural pixels is reached (i.e., the number of pixels counted at step 166 plus the focus parameter), the corresponding gradient magnitude value is identified as the final gradient threshold 204. In the presently preferred embodiment, the FGT value is then scaled by multiplication by a value which may be automatically determined or which may be set by a user. For example, a value of 1.9 may be employed for scaling the FGT, depending upon the image characteristics, the type and features of the structure viewable in the image, and so forth.

Based upon this scaled final gradient threshold, a new binary mask is defined by assigning pixels having values equal to or greater than the FGT a value of 1, and all other pixels a value of zero. At step 170 the resulting binary mask is filtered to eliminate small, isolated segments in a process identical to that described above with respect to step 164 and FIG. 8. However, at step 170 rather than a four-connected neighborhood, a eight-connected neighborhood (i.e., including pixels having shared edges and corners bounding the pixel of interest) is considered in the index number merger steps.

At step 172, certain of the isolated regions may be recuperated to provide continuity of edges and structures. In the present embodiment, for example, if a pixel in the gradient image is above a second gradient threshold, referred to as GFT, and is connected (i.e. immediately adjacent) to a pixel which is above the FGT, the corresponding pixel in the binary image is changed from a 0 value to a value of 1. The value of the GFT may be set to a desired percentage of the FGT, and may be determined empirically to provide the desired degree of edge and structure continuity. This gradient following step is preferably carried out recursively to determine an initial classification of the pixels.

At step 174 in FIG. 5, the feature edges identified through the previous steps, representative of candidate structures in the image, are binary rank order filtered. While various techniques may be employed for this enhancing identified candidate structures, it has been found that the binary rank order filtering provides satisfactory results in expanding and defining the appropriate width of contiguous features used to define structural elements. Steps in exemplary control logic for implementing the binary rank order filtering of step 174 are illustrated in FIG. 9.

Figure 9:
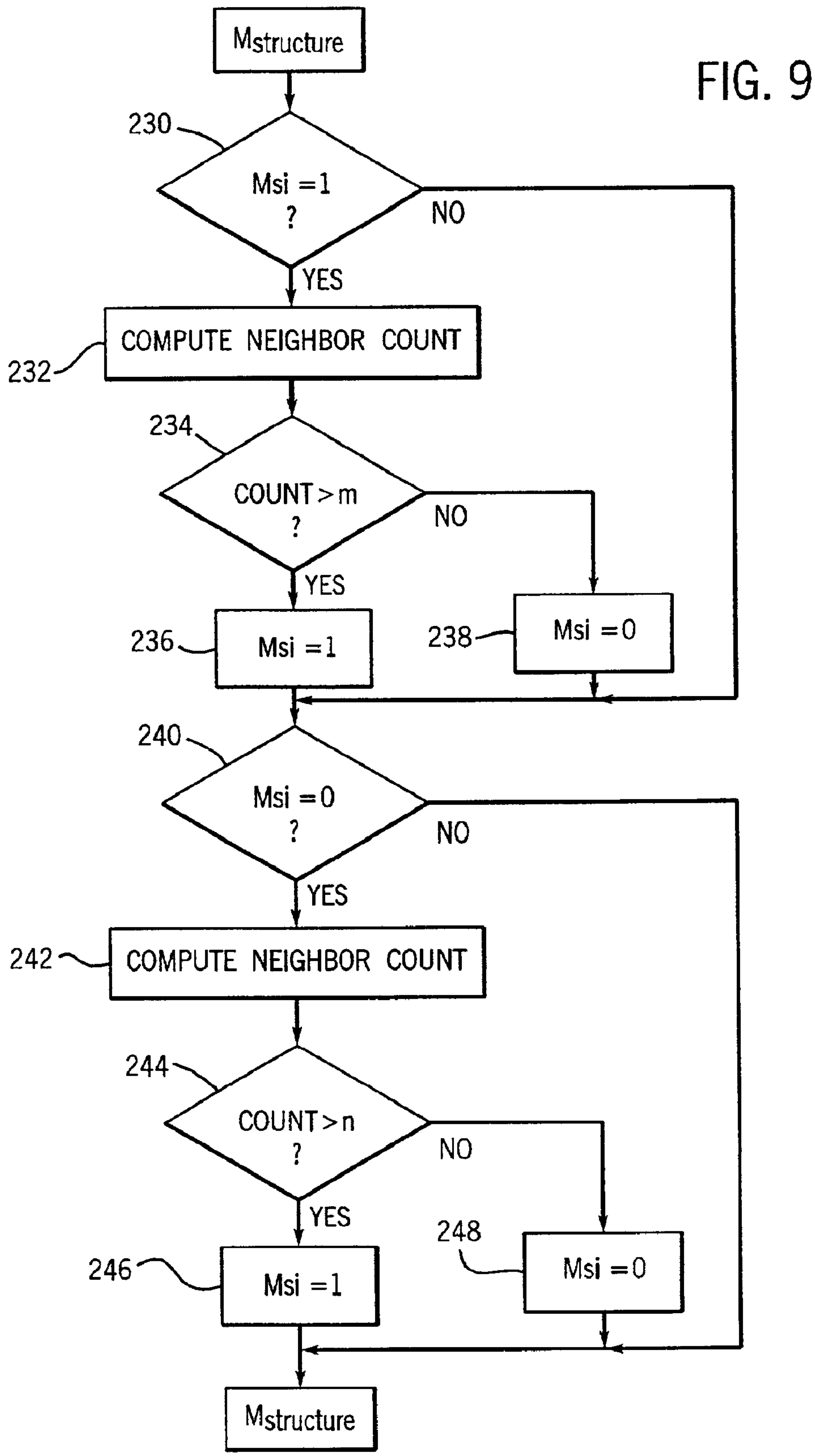
FIG. 9 is a flow chart of steps in exemplary control logic for processing structural features identified in the image by binary rank order filtering.

Referring to FIG. 9, the binary rank order filtering begins at step 230 with the binary mask generated and refined in the foregoing steps. At step 230, circuit 24 determines whether each pixel in the binary mask has a value of 1. If the pixel found to have a value of 1 in the mask, a neighborhood count is performed at step 232. In this neighborhood count, pixels in the binary mask having values of 1 are counted within a 3×3 neighborhood surrounding the structural pixel of interest. This count includes the pixel of interest. At step 234, circuit 24 determines whether the count from step 232 exceeds a desired count m. In the present embodiment, the value of m used at step 234 is 2. If the count is found to exceed the value m the value of 1 is reassigned to the pixel of interest, as indicated at step 236. If, however, the count is found not to exceed the value of m the pixel of interest is assigned the value of 0 in the mask as indicated at step 238. Following steps 236 and 238, or if the pixel is found not to have an original value of 1 in the mask at step 230, control proceeds to step 240.

At step 240, circuit 24 reviews the structure mask to determine whether each pixel of interest has a value of 0. If a pixel is located having a value of 0, circuit 24 advances to step 242 to compute a neighborhood count similar to that described above with respect to step 232. In particular, a 3×3 neighborhood around the non-structure pixel of interest is examined and a count is determined of pixels in that neighborhood having a mask value of 1. At step 244 this neighborhood count is compared to a parameter n. If the count is found to exceed the parameter n, the mask value for the pixel is changed to 1 at step 246. If the value is found not to exceed n, the mask pixel retains its 0 value as indicated at step 248. In the present embodiment, the value of n used in step 244 is 2. Following step 246 or step 248, the resulting structure mask 76, $M_{structure}$, contains information identifying structural features of interest and non-structural regions. Specifically, pixels in structure mask 76 having a value of 1 are considered to identify structure, while pixels having a value of 0 are considered to indicate non-structure.

Figure 10:
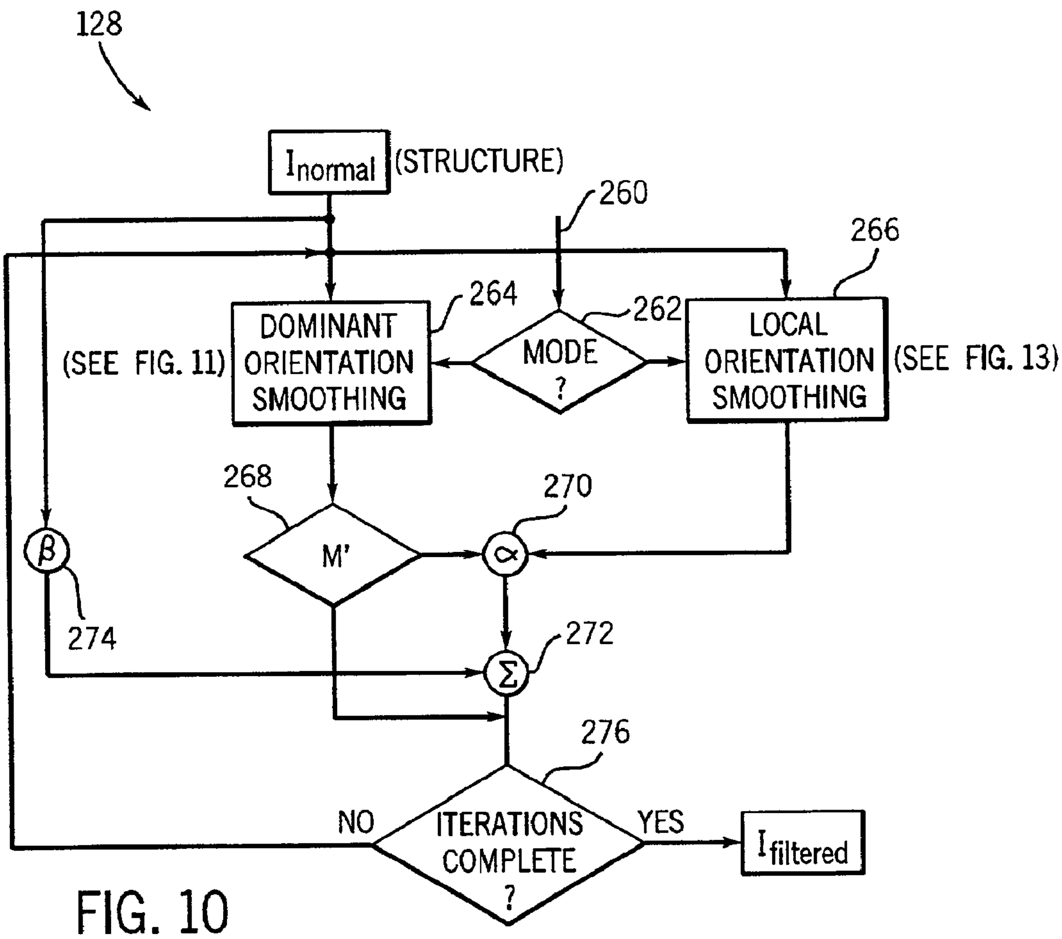
FIG. 10 is a flow chart illustrating steps in exemplary control logic for orientation smoothing of structure identified in an image.

With the structure of the image thus identified, orientation smoothing of the structure, as indicated at step 128 of FIG. 4, is carried out through logic such as that illustrated diagrammatically in FIG. 10. As shown in FIG. 10, the orientation smoothing of image structure begins by looking at the structure pixels of normalized image 74, as determined via application of structure mask 76, and may proceed in different manners depending upon the type of smoothing desired. In particular, based upon an operator input designated 260 in FIG. 10, a logical decision block 262 directs signal processing circuit 24 to either dominant orientation smoothing as indicated at reference numeral 264 or local orientation smoothing as indicated at 266. If dominant orientation smoothing is selected, the intensity values for the structural pixels are processed as summarized below with respect to FIG. 11, to generate a binary mask M'. Following iterations of the procedure outlined below with reference to FIG. 11, the values of mask M' are evaluated at step 268, and smoothing is performed on the structure intensity values by use of multipliers α and β resulting in values which are then summed as indicated at blocks 270, 272 and 274 of FIG. 10 and as summarized in greater detail below.

Figure 12:
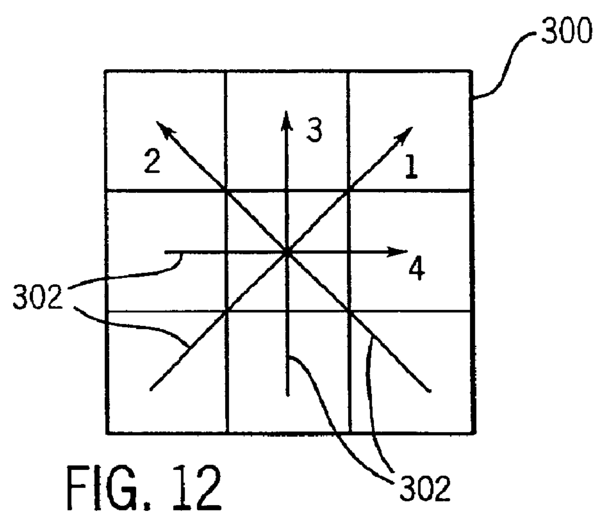
FIG. 12 is a diagram of directional indices employed in the orientation smoothing process of FIG. 10.
Figure 11:
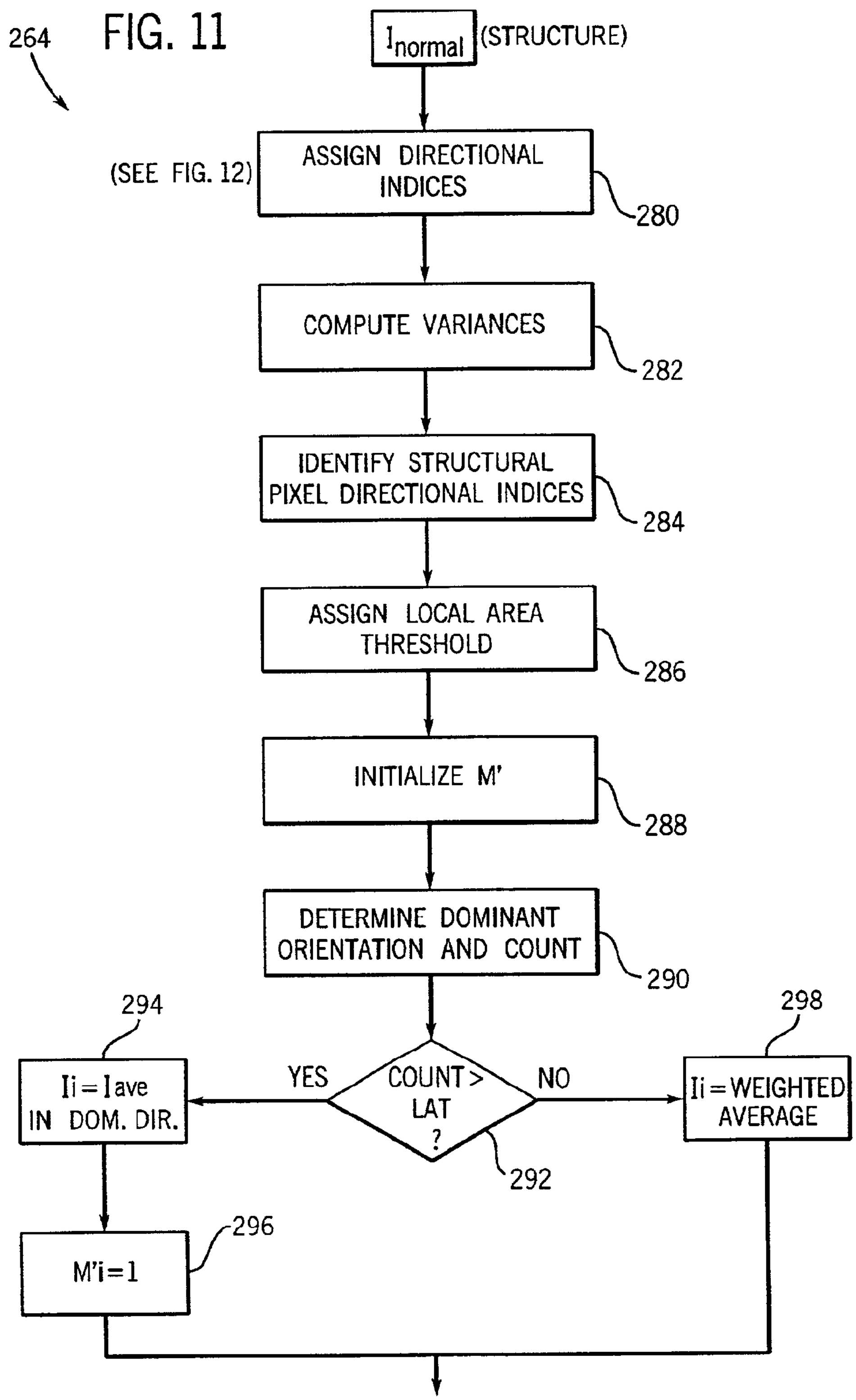
FIG. 11 is a flow chart illustrating steps in exemplary control logic for performing dominant orientation smoothing in the process summarized in FIG. 9.

To explain the dominant orientation smoothing step of 264, reference is now made to FIG. 11. As illustrated in FIG. 11, the dominant orientation smoothing begins with assigning directional indices to each pixel identified as a structural pixel in structure mask 76. In the present embodiment, one of four directional indices is assigned to each structural pixel in accordance with the statistical variances for each pixel, as shown in FIG. 12. As illustrated in FIG. 12, within a local neighborhood 300 surrounding each structural pixel, statistical variances for pixel kernels in four directions are computed by reference to the normalized intensity values of the surrounding pixels. The direction of the minimum variance is selected from the four computed values and a corresponding directional index is assigned as indicated by reference numeral 302 in FIG. 12. In the present embodiment these directional indices are assigned as follows: "1" for 45 degrees; "2" for 135 degrees; "3" for 90 degrees; and "4" for 0 degrees. These steps are summarized as 282 and 284 in FIG. 11. At step 286 a local area threshold value is assigned based upon the image matrix size. In the present embodiment, a local area threshold of 6 is used for 256×256 pixel images, a value of 14.25 is used for 512×512 pixel images, and a value of 23 is used for 1024×1024 pixel images.

At step 288, a binary mask M' is initialized with zero values for each pixel. At step 290 a dominant orientation is established for each structural pixel by examining the directional indices set in step 284 within a local neighborhood surrounding each structural pixel. In this process, the directional indices found in the local neighborhood are counted and the pixel of interest is assigned the directional index obtaining the greatest count (or the lowest index located in the case of equal counts).

In the present embodiment, both the dominant direction and its orthogonal direction are considered to make a consistency decision in the dominant orientation smoothing operation. In terms of FIG. 12, these directions are 1 and 2, or 3 and 4. It has been found that considering such factors substantially improves the robustness of the dominant orientation determination in the sense of being consistent with the human visual system (i.e. providing reconstructed images which are intuitively satisfactory for the viewer).

The consistency decision made at step 290 may be based upon a number of criteria. In the present embodiment, the image is smoothed along the dominant direction (i.e. the direction obtaining the greatest number of counts in the neighborhood) if any one of the following criteria is met: (1) the number of counts of the orientation obtaining the greatest number is greater than a percentage (e.g. 67%) of the total neighborhood counts, and the orthogonal orientation obtains the least counts; (2) the number of counts of the orientation obtaining the maximum counts is greater than a smaller percentage than in criterion (1) (e.g. 44%) of the total neighborhood counts, and the orthogonal direction obtains the minimum number, and the ratio of the counts of the dominant direction and its orthogonal is greater than a specified scalar (e.g. 5); or (3) the ratio of the dominant direction counts to its orthogonal direction counts is greater than a desired scalar multiple (e.g. 10).

In the present embodiment, the neighborhood size used to identify the direction of dominant orientation in step 290 is different for the series of image matrix dimensions considered. In particular, a 3×3 neighborhood is used for 256×256 pixel images, a 5×5 neighborhood is used for 512×512 pixel images, and a 9×9 neighborhood is used for 1024×1024 pixel images.

At step 292, the count determined in the searched neighborhood for each pixel is compared to the local area threshold. If the count is found to exceed the local area threshold, signal processing circuit 24 advances to step 294. At that step, the intensity value for each structural pixel is set equal to the average intensity of a 3×1 kernel of pixels in the dominant direction for the pixel of interest. Subsequently, at step 296, the value of a corresponding location in the binary matrix M' is changed from 0 to 1. If at step 292, the count is found not to exceed the local area threshold for a particular pixel, the intensity value for the pixel of interest is set equal to a weighted average as indicated at step 298. This weighted average is determined by the relationship:

$$\text{weighted avg}=(1/1+p)(\text{input})+(p/1+p)(\text{smoothed value});$$

where the input value is the value for the pixel of interest at the beginning of routine 264, p is a weighting factor between 1 and 200, and the smoothed value is the average intensity of a 3×1 kernel in the dominant direction of the pixel of interest. From either step 296 or 298, circuit 24 returns to step 268 of FIG. 10. Referring again to FIG. 10, at step 268, the values of each pixel in the binary mask M' are evaluated. If the value is found to equal zero, the corresponding intensity value is multiplied by a weighting factor α at step 270. In the present embodiment, factor α is set equal to 0.45. At block 272 the resulting value is summed with the product of the normalized intensity value for the corresponding pixel and a weighting factor β as computed at step 274. In the present embodiment, the factors α and β have a sum equal to unity, resulting in a value of β equal to 0.55.

If at step 268 the value for a particular pixel is found to equal 1 in the binary mask M', control advances to decision block 276. Decision block 276 is also reached following the summation performed at block 272 as described above. In the present embodiment, the foregoing dominant orientation smoothing steps are performed over a desired number of iterations to provide sufficient smoothing and bridging between structural regions. At step 276, therefore, circuit 24 determines whether the desired number of iterations have been completed, and if not, returns to step 264 to further smooth the structural regions. In the present embodiment, the operator may select from 1 to 10 such iterations.

Figure 13:
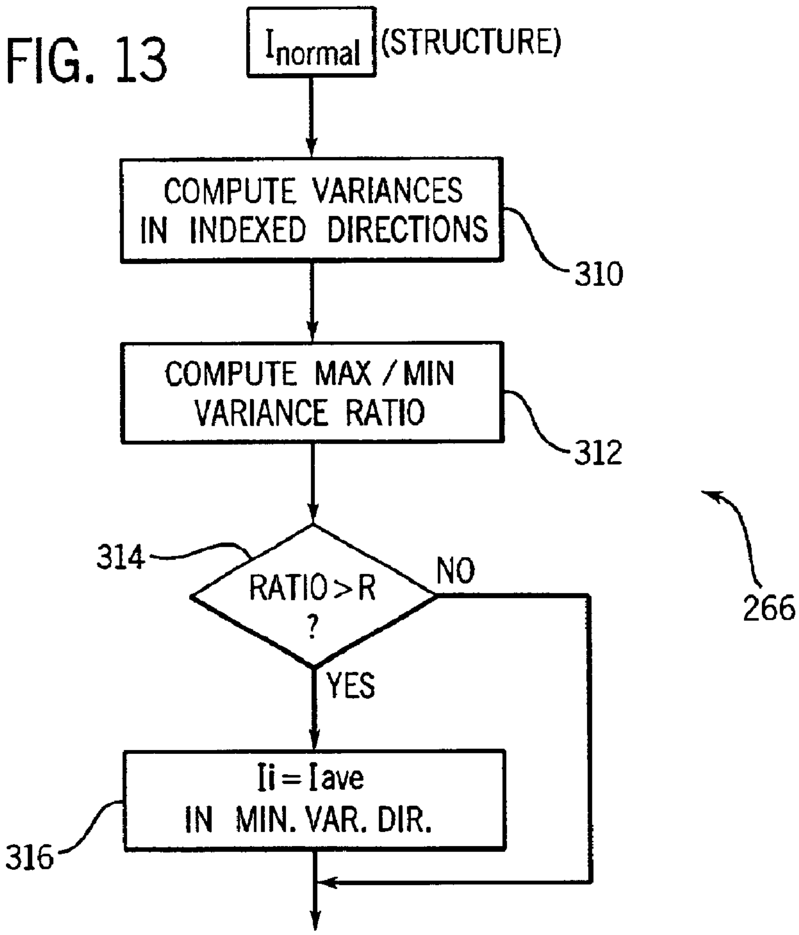
FIG. 13 is a flow chart of steps in exemplary control logic for performing local orientation smoothing through the process of FIG. 9.

As noted above, the orientation smoothing can proceed through an alternative sequence of steps for local orientation smoothing as noted at block 266 in FIG. 10. FIG. 13 illustrates exemplary steps in control logic for such local orientation smoothing. As with the dominant orientation smoothing, the local orientation smoothing begins with the normalized intensity values for the structural pixels. At step 310, statistical variances for 3×1 pixel kernels about each structural pixel are calculated for each indexed direction (see FIG. 12) as described above for the dominant orientation smoothing process. At step 312, a ratio of the maximum/minimum statistical variances identified for each pixel in step 310 is computed. At step 314 this ratio for each structural pixel is compared to a parameter R, referred to as a relaxation factor for the local orientation filtering. In the present embodiment, the value of R can be set between 1 and 200. If at step 314 the variance ratio is found to exceed R, local orientation filtering is accomplished as indicated at step 316 by setting the intensity value for the structural pixel of interest equal to an average value for the 3×1 pixel kernel in the direction of the minimum variance. If at step 314 the ratio between the maximum and minimum variances for the pixel of interest is found not to exceed R, no local orientation smoothing is performed and circuit 24 advances to a point beyond step 316. From this point, control returns to block 270 of FIG. 10.

As illustrated in FIG. 10, at block 270 the intensity value for each structural pixel is multiplied by a weighting factor α, and combined at block 272 with the product of the normalized intensity value for the corresponding pixel and a weighting factor β produced at block 274. As summarized above, at step 276, circuit 24 determines whether the desired number of iterations has been completed and, if not, returns to the local orientation smoothing block 266, to repeat the steps of FIG. 13 until the desired number of iterations is complete. Once the desired iterations have been performed, the filtered image 78 resulting from the orientation smoothing is further filtered by the processes described below.

Figure 14:
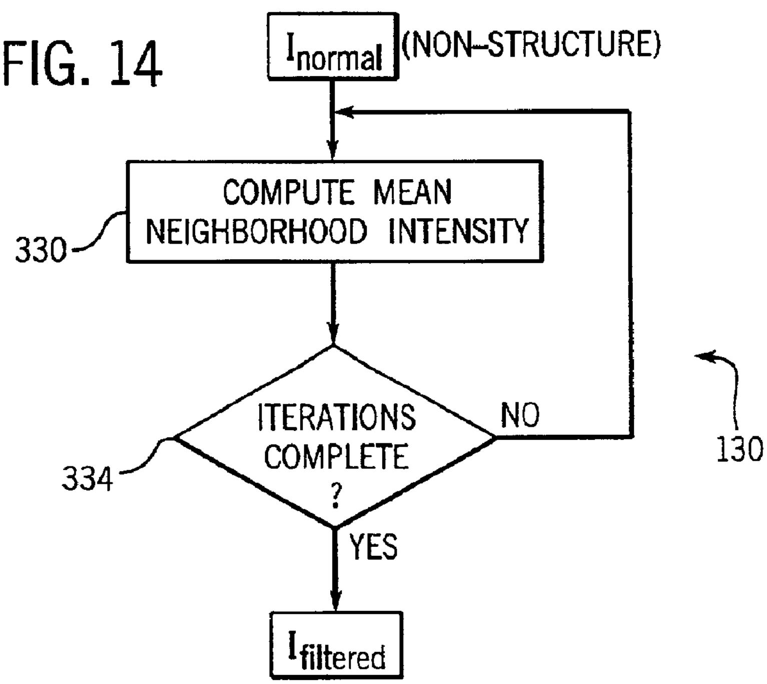
FIG. 14 is a flow chart of steps in exemplary control logic for homogenization smoothing of non-structural regions of a discrete pixel image.

As summarized above with reference to FIG. 4, in parallel with orientation smoothing of the structure identified within the image, homogenization smoothing of non-structure is performed. The steps in a process for such homogenization smoothing are summarized in FIG. 14. As shown in FIG. 14, the normalized intensity values for non-structural pixels are considered in this process. At step 330, the mean neighborhood intensity value for each non-structural pixel is computed (taking into account the normalized values of structural pixels where these are included in the neighborhood considered). In the present embodiment, step 330 proceeds on the basis of a 3×3 neighborhood surrounding each non-structural pixel. This mean value is assigned to the pixel of interest and control advances to step 334. At step 334 circuit 24 determines whether a desired number of iterations has been completed. If not, control returns to step 330 for further homogenization of the non-structural pixel intensity values. Once the desired number of iterations has been completed the homogenization smoothing routine of FIG. 14 is exited. In the present embodiment, the operator may set the number of homogenization smoothing iterations from a range of 1 to 10.

Figure 15:
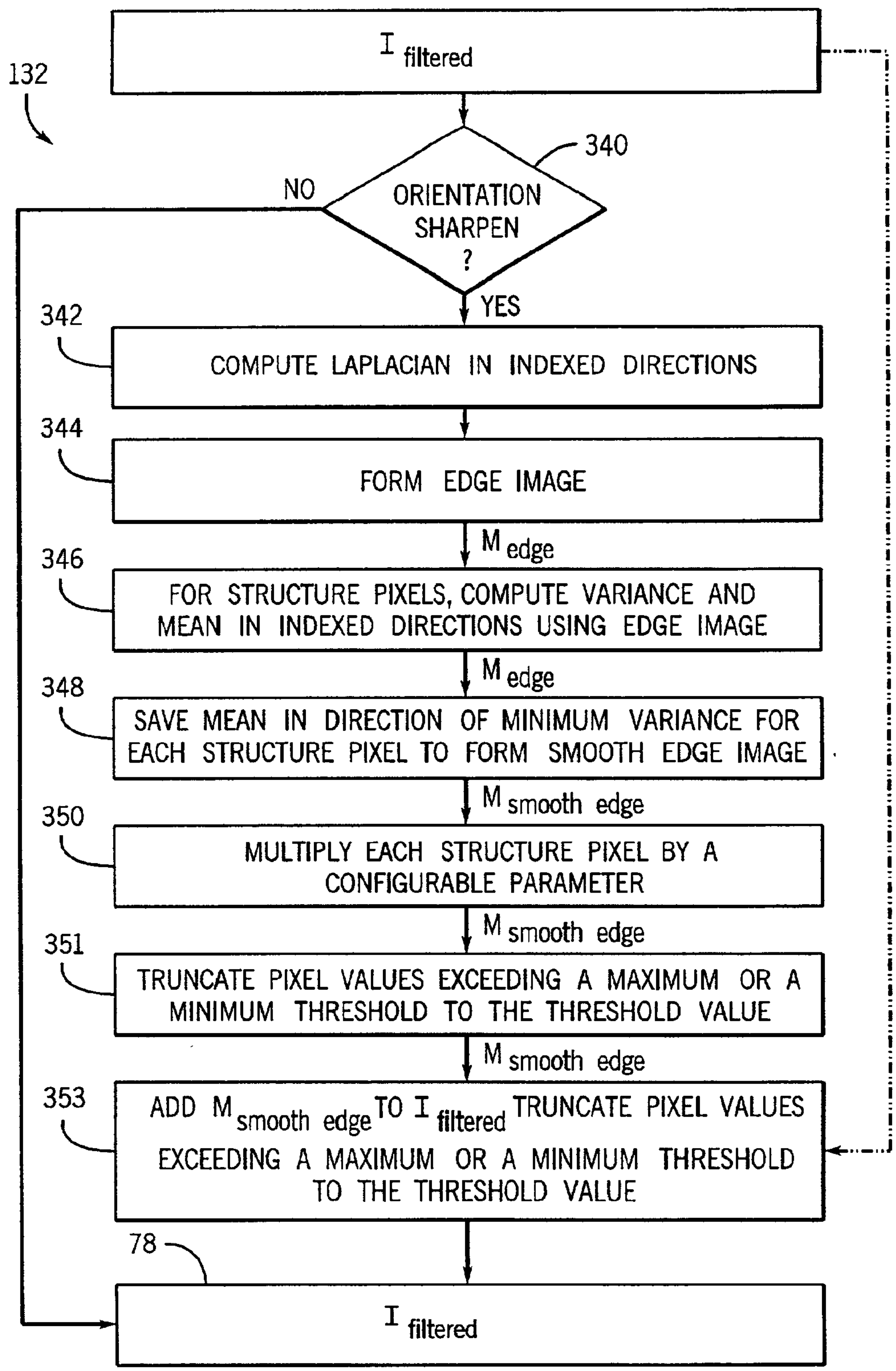
FIG. 15 is a flow chart of steps in exemplary control logic for orientation sharpening of structural regions in a discrete pixel image.

The filtered image is further processed by orientation sharpening of the identified structure pixels as mentioned above with regard to FIG. 4, and as illustrated in greater detail in FIG. 15. As shown in FIG. 15, in the present embodiment, the sharpening is performed only for pixel values which are above a preset lower limit, as indicted at decision block 340. This limit, which may be set to a multiple of the FGT (e.g. 2×FGT), thus avoids enhancement of structural pixels which should not be sharpened. If a structural pixel has a value above the limit, the orientation sharpening sequence begins at step 342 where Laplacian values for each such structural pixel are computed in the indexed directions shown in FIG. 12 and described above. The Laplacian values may be computed from the formula $$E(k)=2.0*I(k)-I(k-1)-I(k+1);$$

where k is the structural pixel of interest, "k−1" is the pixel preceding the pixel of interest in the indexed direction, and "k+1" is the pixel succeeding the pixel of interest in the indexed direction. E(k) is the edge strength and I(k) is the intensity value at the structural pixel of interest. It should be noted that the Laplacian values computed at step 342 are based upon the filtered intensity values (i.e., smoothed values for structure). At step 344, the maximum of the four Laplacian values for each structural pixel is then saved to form an edge mask, $M_{edge}$. In forming $M_{edge}$ border pixels in a given image are set to 0 for the subsequent steps.

At step 346, for each structural pixel of $M_{edge}$, the statistical variances and mean values for a 3×1 pixel kernel are computed in the indexed directions shown in FIG. 12, again using the filtered (i.e., homogenized and smoothed) values for each pixel in the relevant neighborhoods. The direction of minimum variance for each structural pixel is then identified from these values, and the mean value in the direction of minimum variance is saved for each pixel as indicated at step 348 to form a smoothed edge mask, $M_{smooth\ edge}$. At step 350, the mean value in the direction of minimum variance for each structural pixel of $M_{smooth\ edge}$ is multiplied by a configurable parameter. In the present embodiment, the value of the configurable parameter may be set to any number greater than 0 depending on the application. In general, the higher the value of the configurable parameter selected, the greater the overall sharpness of strong edges in the final image.

At step 351, each pixel, after multiplication, is compared to both a minimum and a maximum threshold value. Pixels which exceed the maximum threshold value are set equal to the maximum threshold value. Likewise, pixels which are less than the minimum threshold value are set equal to the minimum threshold value. At step 353, the resulting weighted values, represented in $M_{smooth\ edge}$, are added to the initial filtered values for the corresponding structural pixel to form a new filtered image 78. If the resulting intensity for the structural pixel is less than 0, its intensity is set to 0. In the present preferred embodiment, if the resulting intensity for the structural pixel exceeds 4,095, its intensity is set to 4,095. This upper limit is configurable to any number greater than 0. The effect of the aforementioned operations is to more strongly enhance weaker edges while providing a more limited enhancement to edges which are already strong. The resulting filtered image values are then further processed as described below.

Following orientation sharpening of the structural features of the image and homogenization smoothing of non-structure regions, the entire image is again renormalized as indicated at step 134 in FIG. 4. While various methods may be used for this renormalization, in the present embodiment the global average pixel intensity in filtered image 78 following steps 130 and 132 is computed, and a normalization factor is determined based upon the difference between this average value and the average value prior to the filtration steps described above. The new normalized intensity value for each pixel is then determined by multiplying this normalization factor by the filtered pixel intensity, and adding the global minimum intensity value from the original data to the product.

The resulting renormalized image 80, denoted $I_{renormal}$ in FIG. 4, is then expanded by the same factor, X, by which the input image 70 was shrunk. Structure mask 76 is also expanded by this time by the same factor. Various suitable interpolation techniques may be used to accomplish this expansion including cubic interpolation. The products of expansion step 135 are thus an expanded structure mask 83 and an expanded image 82, each with the same dimensions as original input image 70.

Expanded image 82 is processed to blend texture from input image 70 into expanded image 82 via expanded structure mask 83, as can be seen in FIG. 4 at step 136. This texture blending step is summarized in FIG. 16. Expanded structure mask 83 allows texture blended with pixels from expanded image 82 to be weighted differently depending upon whether a pixel is defined as structure or non-structure.

Figure 16:
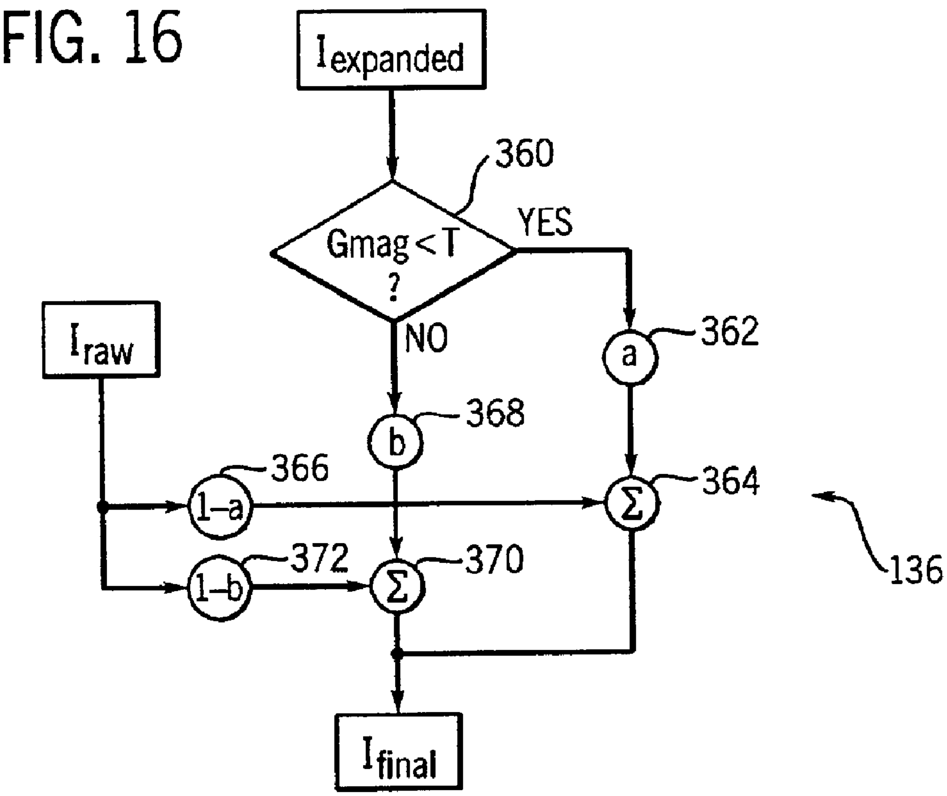
FIG. 16 is a flow chart illustrating steps in exemplary control logic for reintroducing certain textural features of non-structural regions in a discrete pixel image.

In general, the steps of FIG. 16 tend to add more or less original texture depending upon the gradient magnitude of the pixels. In particular, at step 360, the gradient magnitude for each pixel of interest is compared to a threshold value T. In the present embodiment, this threshold is set to a value of 300. If the gradient is found not to exceed the threshold, the pixel intensity value is multiplied by a value "a" at step 362. The resulting product is added at step 364 to the product of the raw intensity value for the pixel (prior to the shrinking at step 123 of FIG. 4) multiplied by a value equal to "1−a" at step 366. The resulting weighted average is assigned to the pixel.

If at step 360, the gradient magnitude value for a pixel is found to exceed the threshold value T, the pixel intensity is multiplied by a factor "b", as noted at step 368. The resulting product is then added at step 370 to the product of the raw intensity for that pixel and a multiplier equal to "1−b" determined at step 372. In the present embodiment, the value of "b" may be set within a range from 0 to 1, with the value of "a" being set equal to 1.5 times the value of "b". As will be apparent to those skilled in the art, the weighted averaging performed by the steps summarized in FIG. 16 effectively adds texture to provide an understandable environment for the structures identified as described above. By performing the comparison at step 360, the process effectively adds less original texture for pixels having low gradient values, and more original texture for pixels having higher gradient values. Where desired, the values of "a" and "b" may be set so as to increase or decrease this function of the process. The product of the differential textural blending of step 136 is blended image 84.

Figure 17:
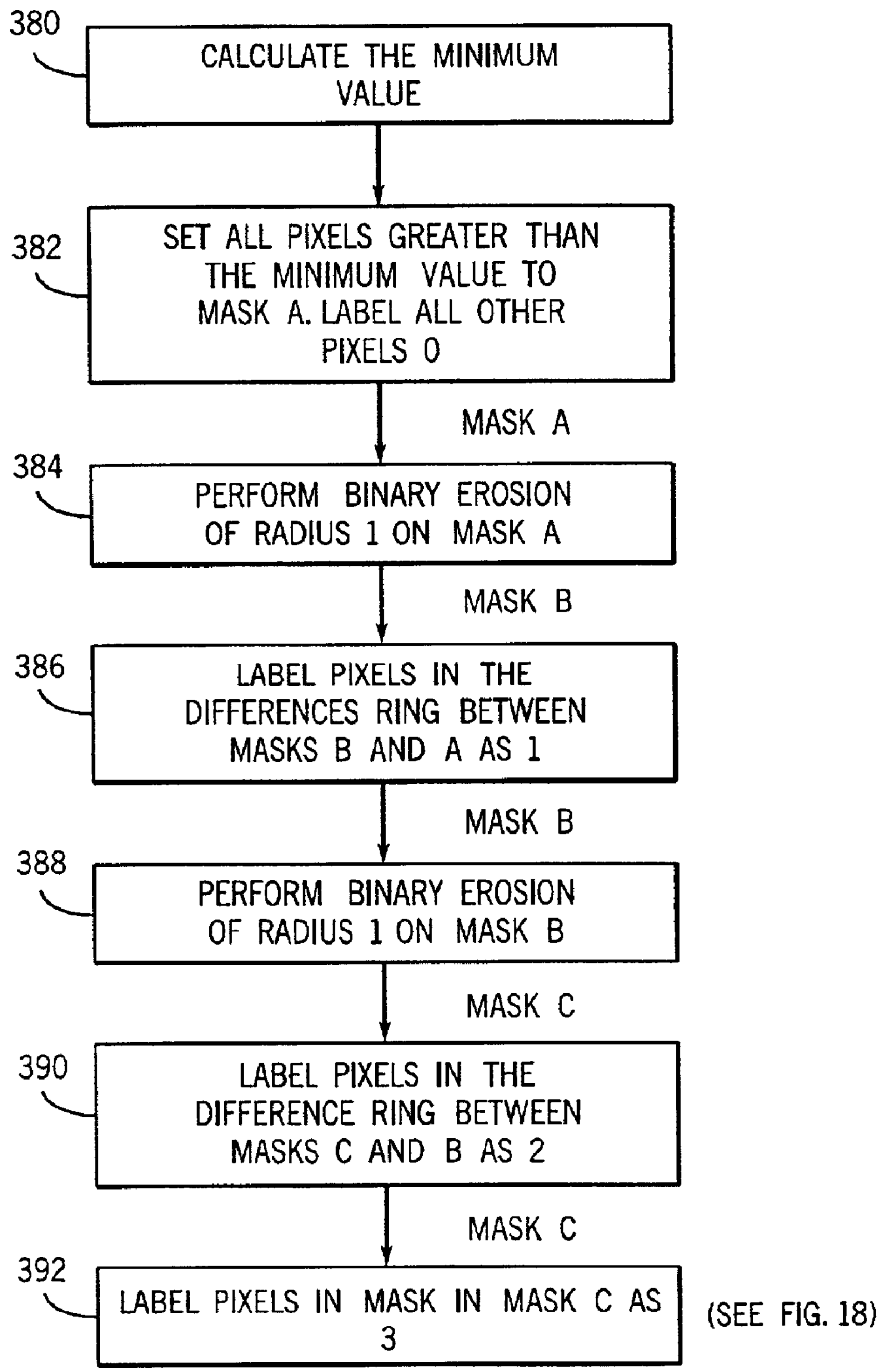
FIG. 17 is a flow chart of steps in the creation of CT masks.

Next, in step 140, intensity irregularities are corrected in the vicinity of the CT circle using a CT mask created in step 138, as illustrated in FIG. 17. In step 380, the first step in creating the CT mask is calculating the minimum intensity value in blended image 84. All pixels equal to the minimum are labeled 0 in step 382. Also in step 382, all pixels greater than the minimum form mask A. Next, in step 384, a binary erosion of radius 1 is performed on mask A to obtain eroded mask B. In step 386, pixels in the difference ring between mask A and mask B are labeled 1. Next, in step 388, a binary erosion of radius 1 is performed on mask B to obtain eroded mask C. In step 390, pixels in the difference ring between mask B and mask C are labeled 2. Finally, in step 392, those pixels in mask C are labeled 3.

Figure 18:
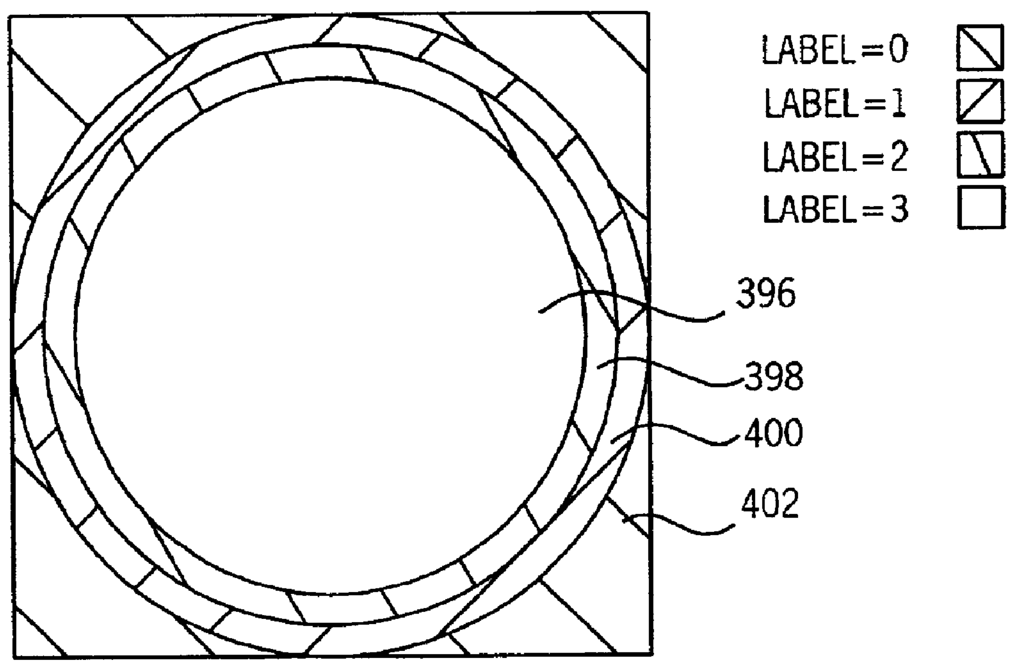
FIG. 18 is a schematic of a CT mask.

In the preferred embodiment, the resulting CT mask, illustrated as FIG. 18 is composed of an inner circle, two larger concentric rings and an outer region, each labeled differently. Inner circle 396 is labeled 3. Small ring 398 is labeled 2. Large ring 400 is labeled 1 and outer region 402 is labeled 0.

Returning to FIG. 4, in step 140 the extracted CT mask 86 is then used to correct intensity values in the vicinity of the CT circle. In the preferred embodiment each labeled area is differentially processed according to the following steps. Pixels in outer region 402 are set to the value of corresponding pixels from pre-processed image 71. Pixels in large ring 400 are set to a value equal to $(1-\alpha)$(corresponding pixel from pre-processed image 71)+$(\alpha)$(corresponding pixel from blended image 84) where $0<\alpha<1$. Pixels in small ring 398 are set to a value equal to $(1-\beta)$(corresponding pixel from pre-processed image 71)+$(\beta)$(corresponding pixel from blended image 84) where $0<\beta<1$. Generally $\beta 0$ will be greater than $\alpha$. Pixels in inner circle 396 remain equal to the value of corresponding pixels from blended image 84. The intensity value correction results in pixels near the center of the image retaining their full filtered values while pixels nearer to the edge of the circle are combined with their pre-filtered values in proportion to their distance from the center. The pixels farthest from the center of the image receive the greatest correction back to their pre-filtered values. The result of correction step 140 is corrected image 88.

In step 142, the minimum intensity value added to initial image 70 in step 116 is algebraically subtracted from all of the intensity values of corrected image 88. Step 142 serves to return the image intensity back to the initial format and results in offset image 90. Finally, in step 144, a filter strength dependent constant is subtracted from all intensity values of offset image 90. The constant is empirically determined based upon the filter settings. Step 144 is performed to avoid a CT number change in large uniform image regions as a result of the filtering process. Examples of filter strength types and their empirically determined constant values in the preferred embodiment may be seen in the following table:

| FILTER TYPE | VALUE |
|---|---|
| Low Normal | 0 |
| Medium Normal | 1 |
| High Normal | 2 |
| Low Special | 1 |
| Medium Special | 1 |
| High Special | 2 |

Subtraction of the filter strength dependent constant in step 144 produces final image 92. Final image 92 may be displayed, stored in memory, or further processes and analyzed.

What is claimed is:

1. A method for reducing noise in a discrete pixel image, the method comprising the steps of:

(a) shrinking an initial image by a given factor to produce a shrunken image;

(b) reducing image noise by selectively processing one or more selected regions of the shrunken image and differentially processing one or more non-selected regions of the shrunken image such that a processed image results;

(c) expanding the processed image by the given factor to produce an expanded image;

(d) blending one or more selected regions of the expanded image with one or more corresponding regions of the initial image to produce a blended image; and (e) correcting a plurality of intensity values of the blended image by differentially processing two or more regions.

2. The method of claim 1, wherein the step of shrinking is accomplished by a sub-sampling technique.

3. The method of claim 2, wherein the sub-sampling technique is pixel averaging.

4. The method of claim 3, wherein the pixel averaging is non-overlapping.

5. The method of claim 1, wherein the step of shrinking is accomplished by use of a boxcar filter.

6. The method of claim 1, wherein the given factor is multi-dimensional and each dimensional factor is greater than or equal to one.

7. The method of claim 1, wherein the selected regions are determined based upon a scaled threshold value.

8. The method of claim 7, wherein the scaled threshold value is computed based upon an initial threshold value and a scaling factor input by a user.

9. The method of claim 1, wherein in step (b) the selected regions comprise pixels having values below a first threshold value but above a second threshold value, and positioned adjacent to a pixel having a value at or above the first threshold value.

10. The method of claim 9, wherein the first threshold is based upon a scaling factor selected by a user.

11. The method of claim 1, wherein in step (b) the processing of selected regions comprises smoothing pixels based upon a dominant orientation and an orientation orthogonal to the dominant orientation.

12. The method of claim 1, comprising the further step of smoothing image data contained in the shrunken image prior to identifying the selected regions.

13. The method of claim 1, wherein in step (b) the processing of selected regions comprises directional sharpening of pixels in the selected region having a value above a desired lower limit value.

14. The method of claim 13, wherein the process of sharpening comprises comparing a sharpened pixel in the selected region to one or more thresholds and limiting the value of the sharpened pixel to the threshold value where the sharpened pixel value exceeds the threshold value.

15. The method of claim 1, wherein the step of expanding is accomplished using an interpolation technique.

16. The method of claim 15, wherein the interpolation technique is cubic interpolation.

17. The method of claim 1, wherein in step (d) the blending of one or more selected regions comprises one region comprising the one or more selected regions of step (b) and one region comprising the one or more non-selected regions of step (b).

18. The method of claim 1, wherein in step (d) the blending of one or more selected regions with the one or more corresponding regions may occur in different proportions for different selected regions.

19. The method of claim 1, wherein in step (e) the two or more selected regions are selected by a mask.

20. The method of claim 19, wherein the mask is formed by determining a minimum intensity value from among a plurality of pixels having individual intensity values and designating a first region comprising those pixels with intensity values equal to the minimum intensity value and a second region comprising those pixels with intensity values exceeding the minimum intensity value.

21. The method of claim 20, wherein a first binary erosion is performed on the second region to form a third region comprising a fraction of the second region.

22. The method of claim 21, wherein a second binary erosion is performed on the third region to form a fourth region comprising a fraction of the third region.

23. The method of claim 22, wherein one or more subsequent binary erosions are performed to form one or more additional regions each comprising a fraction of the third region.

24. The method of claim 1, comprising the further step, prior to the step of shrinking, of determining a minimum intensity value from among a plurality of individual intensity values of an initial image and adding the minimum intensity value to each individual intensity value of the initial image.

25. The method of claim 24, comprising the further step, after the step of correcting, of subtracting the minimum intensity value from each individual intensity value of the corrected image.

26. The method of claim 1, comprising the further step, after the step of correcting, of subtracting a constant from each individual intensity values of the corrected image.

27. The method of claim 26, wherein the constant is empirically determined based upon a user configurable parameter.

28. The method of claim 27, wherein the user configurable parameter is a filter setting.

29. A method for reducing noise in a discrete pixel image, the method comprising the steps of:

(a) sub-sampling an initial image containing image data representative of pixels of a reconstructed image such that a shrunken image results and such that the initial image is shrunk by a factor greater than one;

(b) identifying one or more structural features from the image data represented in the shrunken image;

(c) smoothing the structural features to enhance a dominant orientation of the structural features;

(d) smoothing non-structural region to enhance a homogenization of the non-structural region;

(e) sharpening the structural features to enhance the dominant orientation associated with the structural features;

(f) expanding the shrunken image by the factor such that an expanded image results which has the same dimensions as the initial image;

(g) blending a fraction of the expanded image with image data from the first initial image to form a blended image; and (h) correcting intensity values of the blended image by identifying two or more regions within the blended image and modifying each region differentially to form a corrected image.

30. The method of claim 29, wherein the step of sub-sampling is accomplished by pixel averaging.

31. The method of claim 30, wherein the pixel averaging is non-overlapping.

32. The method of claim 29, wherein the step of sub-sampling is accomplished by use of a boxcar filter.

33. The method of claim 29, wherein the factor is multi-dimensional and each dimensional factor is greater than or equal to one.

34. The method of claim 29, wherein the structural features are determined based upon a scaled threshold value.

35. The method of claim 34, wherein the scaled threshold value is computed based upon an initial threshold value and a scaling factor input by a user.

36. The method of claim 29, wherein in step (b) the structural features comprise pixels having values below a first threshold value but above a second threshold value, and positioned adjacent to a pixel having a value at or above the first threshold value.

37. The method of claim 36, wherein the first threshold is based upon a scaling factor selected by a user.

38. The method of claim 29, wherein in step (c) the smoothing of structural features to enhance their dominant orientation includes smoothing pixels based upon a dominant orientation and an orientation orthogonal to the dominant orientation.

39. The method of claim 29, comprising the further step of smoothing image data contained in the shrunken image prior to identifying the structural features.

40. The method of claim 29, wherein in step (e) the sharpening of structural features to enhance their dominant orientation comprises the sharpening of pixels in the structural features having a value above a desired lower limit value.

41. The method of claim 40, wherein the process of sharpening comprises comparing a sharpened pixel in the structural features to one or more thresholds and limiting the value of the sharpened pixel to the threshold value where the sharpened pixel value exceeds the threshold value.

42. The method of claim 29, wherein the step of expanding is accomplished using an interpolation technique.

43. The method of claim 42, wherein the interpolation technique is cubic interpolation.

44. The method of claim 29, wherein in step (g) the fraction comprises two or more portions such that the two or more portions are blended in different proportions.

45. The method of claim 44, wherein one portion comprises the structural features and one portion comprises the non-structural region.

46. The method of claim 29, wherein in step (h) the two or more regions are selected by a mask.

47. The method of claim 46, wherein the mask is formed by assigning each pixel a region based upon the pixel's representative position within a computed tomography imaging circle.

48. The method of claim 29, comprising the further step, prior to the step of sub-sampling, of determining a minimum intensity value of an initial image and adding the minimum intensity value to each pixel of the initial image.

49. The method of claim 48, comprising the further step, after the step of correcting, of subtracting the minimum intensity value from each pixel of the corrected image.

50. The method of claim 29, comprising the further step, after the step of correcting, of subtracting a constant from each pixel.

51. The method of claim 50, wherein the constant is empirically determined based upon a user configurable filter setting.

52. A system for reducing noise in a discrete pixel image, the system comprising:

an output device for producing a reconstructed image based upon processed image data; and a signal processing circuit configured to provide processed image data by sub-sampling an initial image to produce a shrunken image, identifying one or more selected regions of the shrunken image using one or more selection criteria, differentially processing the selected regions and one or more non-selected regions to create a processed image, expanding the processed image to the same dimensions as the initial image, blending a fraction of the expanded image data with the initial image data, and differentially correcting intensity values in two or more regions of the blended image using an image mask.

53. The system of claim 52, further comprising an image data acquisition system for producing image data signals processed by the signal processing circuit.

54. The system of claim 53, wherein the image data acquisition system comprises a computed tomography system.

55. The system of claim 52, wherein the selected region is determined based upon a scaled threshold value.

56. The system of claim 55, wherein the scaled threshold value is computed based upon an initial threshold value and a scaling factor input by a user.

57. The system of claim 52, wherein the selected region comprises pixels having values below a first threshold value but above a second, lower threshold value, and positioned adjacent to a pixel having a value at or above the first threshold value.

58. The system of claim 52, wherein the sub-sampling is accomplished by pixel averaging.

59. The system of claim 58, wherein the pixel averaging is non-overlapping.

60. The system of claim 52, wherein the step of sub-sampling is accomplished by use of a boxcar filter.

61. The system of claim 52, wherein the sub-sampling factor by which the initial image is shrunk is multi-dimensional and each dimensional factor is greater than or equal to one.

62. The system of claim 52, wherein the step of expanding is accomplished using an interpolation technique.

63. The system of claim 62, wherein the interpolation technique is cubic interpolation.

64. The system of claim 52, wherein the fraction of the expanded image data comprises two or more portions such that the two or more portions are blended in different proportions.

65. The system of claim 64, wherein one portion comprises the selected regions and one portion comprises the non-selected regions.

66. The system of claim 52, wherein the image mask is formed by assigning each pixel to a region based upon the pixel's representative position within a computed tomography imaging circle.

67. The system of claim 52, wherein the signal processing circuit is further configured to provide processed image data by adding a minimum intensity value to each of the individual pixels of an initial image prior to sub-sampling the initial image.

68. The system of claim 67, wherein the signal processing circuit is further configured to provide processed image data by subtracting the minimum intensity value from each of the individual pixels of the corrected image.

69. The system of claim 52, wherein the signal processing circuit is further configured to provide processed image data by subtracting a constant from each of the individual pixels of the corrected image.

70. The system of claim 69, wherein the constant is empirically determined based upon a user configurable filter setting.

71. A system for reducing noise in a discrete pixel image, the system comprising:

an output device for producing a reconstructed image based upon processed image data; and a signal processing circuit configured to provide processed image data by sub-sampling an initial image to produce a shrunken image, smoothing image data representative of pixels of the shrunken image, identifying one or more structural features from the smoothed image data, orientation smoothing the structural features, homogenization smoothing non-structural regions, orientation sharpening the structural features, expanding the shrunken image to the same dimensions as the initial image to form an expanded image, blending of the initial image data into the expanded image data, and differentially correcting intensity values in two or more regions of the blended image using an image mask.

72. The system of claim 71, further comprising an image data acquisition system for producing image data signals processed by the signal processing circuit.

73. The system of claim 72, wherein the image data acquisition system comprises a computed tomography system.

74. The system of claim 71, wherein the structural features are determined based upon a scaled threshold value.

75. The system of claim 74, wherein the scaled threshold value is computed based upon an initial threshold value and a scaling factor input by a user.

76. The system of claim 71, wherein the structural features include pixels having values below a first threshold value but above a second, lower threshold value, and positioned adjacent to a pixel having a value at or above the first threshold value.

77. The system of claim 71, wherein the orientation smoothing is based upon a dominant orientation and an orientation orthogonal to the dominant orientation.

78. The system of claim 71, wherein orientation smoothing is performed based upon a predetermined relationship between a characteristic of each structural pixel in the dominant orientation and in the orthogonal orientation.

79. The system of claim 78, wherein the characteristic is a number of counts of orientations within a neighborhood of each structural pixel.

80. The system of claim 71, wherein the sharpening is performed only for structural pixels having a value above a desired lower limit value.

81. The system of claim 71, wherein the sub-sampling is accomplished by pixel averaging.

82. The system of claim 81, wherein the pixel averaging is non-overlapping.

83. The system of claim 71, wherein the step of sub-sampling is accomplished by use of a boxcar filter.

84. The system of claim 71, wherein the sub-sampling factor by which the initial image is shrunk is multi-dimensional and each dimensional factor is greater than or equal to one.

85. The system of claim 71, wherein the step of expanding is accomplished using an interpolation technique.

86. The system of claim 85, wherein the interpolation technique is cubic interpolation.

87. The method of claim 71, wherein the blended image data comprises two or more portions such that the two or more portions are blended in different proportions.

88. The method of claim 87, wherein one portion comprises the structural features and one portion comprises the non-structural region.

89. The system of claim 71, wherein the image mask is formed by assigning each pixel to a region based upon the pixel's representative position within an imaging field.

90. The system of claim 89, wherein the imaging field is a CT imaging circle.

91. The system of claim 71, wherein the signal processing circuit is further configured to provide processed image data by adding a minimum intensity value to each of the individual pixels of an initial image.

92. The system of claim 91, wherein the signal processing circuit is further configured to provide processed image data by subtracting the minimum intensity value from each of the individual pixels of the corrected image.

93. The system of claim 71, wherein the signal processing circuit is further configured to provide processed image data by subtracting a constant from each of the individual pixels of the corrected image.

94. The system of claim 93, wherein the constant is empirically determined based upon a user configurable filter setting.

* * * * *